US012658820B2

(12) United States Patent
Ji et al.

(10) Patent No.: US 12,658,820 B2
(45) Date of Patent: Jun. 16, 2026

(54) POWER SUPPLY MODULE AND TRANSFORMER POWER SUPPLY DEVICE

(71) Applicant: Delta Electronics (Shanghai) Co.,Ltd., Shanghai (CN)

(72) Inventors: Pengkai Ji, Shanghai (CN); Yuan Zhou, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 959 days.

(21) Appl. No.: 17/664,649

(22) Filed: May 23, 2022

(65) Prior Publication Data
US 2022/0393609 A1 Dec. 8, 2022

(30) Foreign Application Priority Data
Jun. 8, 2021 (CN) .......................... 202110638537.0

(51) Int. Cl.
| | |
|---|---|
| *H02M 7/21* | (2006.01) |
| *H01F 27/24* | (2006.01) |
| *H01F 27/28* | (2006.01) |
| *H01F 27/29* | (2006.01) |
| *H01F 38/26* | (2006.01) |
| *H02M 7/04* | (2006.01) |

(Continued)

(52) U.S. Cl.
CPC ............ *H02M 7/219* (2013.01); *H01F 27/24* (2013.01); *H01F 27/2871* (2013.01); *H01F 27/292* (2013.01); *H01F 38/26* (2013.01); *H02M 7/043* (2013.01); *H01F 2027/297* (2013.01); *H01F 2038/026* (2013.01)

(58) Field of Classification Search
CPC ....... H02M 7/219; H02M 7/043; H01F 27/24; H01F 27/2871; H01F 27/292; H01F 38/26; H01F 2027/297; H01F 2038/026
See application file for complete search history.

(56) References Cited

U.S. PATENT DOCUMENTS 9,263,177 B1 * 2/2016 Ikriannikov ........ H01F 17/0013
2006/0176139 A1 8/2006 Pleskach et al.
(Continued)

FOREIGN PATENT DOCUMENTS

CN 103430256 A 12/2013
CN 203503447 U 3/2014
(Continued)

*Primary Examiner* — Malcolm Barnes
(74) *Attorney, Agent, or Firm* — CKC & Partners Co., LLC

(57) ABSTRACT

A power supply module includes a power supply submodule, a plurality of pins, and a second winding unit. The power supply submodule includes a switch, a magnetic core assembly, and a first winding unit including a first winding portion and a second winding portion. The second winding unit includes a third winding portion connected to the first winding portion via some of the plurality of pins to form a first winding, and a fourth winding portion connected to the second winding portion via some of the plurality of pins to form a second winding. The magnetic core assembly, at least the first winding, and the second winding form a magnetic element. The switch is disposed on and electrically connected to the magnetic element. At least one of the plurality of pins is an output pin via which the power supply module powers an intelligent IC load.

24 Claims, 23 Drawing Sheets

(51) Int. Cl.
    *H02M 7/219*      (2006.01)
    *H01F 38/02*      (2006.01)

(56) References Cited

U.S. PATENT DOCUMENTS

| 2013/0056847 | A1* | 3/2013 | Chen | H10D 1/20 |
| | | | | 257/E29.325 |
| 2015/0235753 | A1 | 8/2015 | Chatani et al. | |
| 2017/0084384 | A1* | 3/2017 | Otsubo | H01F 17/06 |
| 2017/0178794 | A1 | 6/2017 | Yan et al. | |
| 2017/0222563 | A1* | 8/2017 | Noma | H01F 27/40 |
| 2017/0345756 | A1 | 11/2017 | Yin et al. | |
| 2019/0333674 | A1* | 10/2019 | Quilici | H05K 3/4611 |
| 2020/0143985 | A1* | 5/2020 | Cai | H01F 27/2852 |
| 2020/0161042 | A1* | 5/2020 | Cai | H01F 27/027 |
| 2020/0169181 | A1* | 5/2020 | Zhou | H02M 7/217 |
| 2020/0260586 | A1 | 8/2020 | Hong et al. | |
| 2021/0005378 | A1 | 1/2021 | Hong et al. | |

FOREIGN PATENT DOCUMENTS

| CN | 103943306 | A | * | 7/2014 |
| CN | 107527727 | A | | 12/2017 |
| CN | 207098945 | U | | 3/2018 |
| CN | 111145987 | A | | 5/2020 |
| CN | 111145988 | A | | 5/2020 |
| CN | 111952293 | A | | 11/2020 |
| CN | 112530680 | A | | 3/2021 |
| GB | 2299714 | B | | 11/1999 |
| JP | H0737712 | A | | 2/1995 |
| JP | 2016082072 | A | | 5/2016 |
| JP | 2017139407 | A | * | 8/2017 |
| PL | 219054 | B1 | | 3/2015 |

* cited by examiner $$2B3 \begin{cases} 251 \\ \\ 252 \end{cases} \quad 21A2 \begin{cases} 212a \\ 212b \\ 211 \end{cases} \quad 22A1 \begin{cases} 222a \\ 222b \\ 221 \end{cases} \quad 21 \begin{cases} 251 \\ \\ 21A2 \end{cases} \quad 22 \begin{cases} 252 \\ \\ 22A1 \end{cases} \quad 200A \begin{cases} 21 \\ 22 \\ 1 \end{cases} \quad 1 \begin{cases} 11 \\ \\ 12 \end{cases}$$

POWER SUPPLY MODULE AND TRANSFORMER POWER SUPPLY DEVICE

CROSS-REFERENCE TO RELATED APPLICATIONS

This non-provisional application claims priority under 35 U.S.C. § 119(a) on Patent Application No. 202110638537.0 filed in P.R. China on Jun. 8, 2021, the entire contents of which are hereby incorporated by reference.

Some references, if any, which may include patents, patent applications and various publications, may be cited and discussed in the description of this disclosure. The citation and/or discussion of such references, if any, is provided merely to clarify the description of the present disclosure and is not an admission that any such reference is "Prior Art" to the present disclosure described herein. All references listed, cited and/or discussed in this specification are incorporated herein by reference in their entireties and to the same extent as if each reference was individually incorporated by reference.

BACKGROUND OF THE INVENTION

1. Field of the Invention

The disclosure relates to a power supply module, and particularly to a power supply module and a transformer power supply device.

2. Related Art

With the development of industries such as the internet, internet of things, artificial intelligence, big data and data center, intelligent ICs, such as CPU, GPU, TPU, or other various ASIC chips for artificial intelligent data processing, are developed rapidly. With the increasing of functions of the various intelligent ICs, power consumption gets larger, devices on a mainboard also become more, and the power module shall have a higher power density, or the single power module has a larger current output capability. However, when a power of an intelligent accelerator card and a server is increased, a space leaving to the power supply system on the system board is compressed, and the demand for a height of the power supply module gets higher.

Currently, a planar transformer is often used in a DC-DC power supply module with a transformer. The planar transformer forms a complete winding using a trace of a printed circuit board (PCB). Generally, signals after voltage transformation and rectification are connected to a system board of the user through terminals formed by copper blocks. As an output connection path is long and an impedance is large, efficiency and dynamic performance are affected. Moreover, the utility rate of space of the power supply module is low, and the power density is to be improved. Further, the winding of the planar transformer is vertical, wherein a magnetic column is inserted into an inner bore of the winding and the magnetic column and the covers are fixed by glue dispensing. A current in the vertical winding is uneven, and loss is large.

Therefore, how to provide a power supply module having a low height and a high power density is the current problem to be solved.

SUMMARY OF THE INVENTION

To solve the above problem, one embodiment of the disclosure provides a power supply module for powering an intelligent IC on a system board, including:

a power supply submodule including:
  a switch;
  a magnetic core assembly including:
    a first magnetic column, and
    a second magnetic column; and
  a first winding unit including:
    a first winding portion wound around the first magnetic column, and
    a second winding portion wound around the second magnetic column;
  a plurality of pins disposed on a lower surface of the power supply submodule; and
  a second winding unit including:
    a third winding portion disposed on or in the system board and wound around the first magnetic column and connected to the first winding portion via at least a part of the plurality of pins to form a first winding, and
    a fourth winding portion disposed on or in the system board and wound around the second magnetic column and connected to the second winding portion via at least a part of the plurality of pins to form a second winding;
  wherein the magnetic core assembly, at least the first winding, and the second winding form a magnetic element, and wherein the switch is disposed on and electrically connected to the magnetic element.

The disclosure further provides a power supply module for powering an intelligent IC on a system board, including:
  a third power supply submodule disposed on an upper surface of the system board and including:
    a first switch,
    a first magnetic column, and
    a first winding portion wound onto the first magnetic column;
  a fourth power supply submodule disposed on a lower surface of the system board and being opposite to the third power supply submodule, including:
    a second switch,
    a second magnetic column, and
    a second winding portion wound around the second magnetic column;
  a plurality of first pins on a lower surface of the third power supply submodule;
  a plurality of second pins on an upper surface of the fourth power supply submodule; and
  a second winding unit including:
    a third winding portion disposed on or in the system board and below the first magnetic column and connected to the first winding portion via at least a part of the plurality of first pins to form a first winding,
    a fourth winding portion disposed on or in the system board and above the second magnetic column and connected to the second winding portion via at least a part of the plurality of second pins to form a second winding;
  wherein the first magnetic column, the second magnetic column, at least the first winding, and the second winding form a magnetic element, and wherein the first switch and the second switch are disposed on and electrically connected to the magnetic element.

The disclosure further provides a voltage conversion device, including:

a power supply module;

a buck power supply module electrically connected to the power supply module and configured to convert a voltage provided by the power supply module to power the intelligent IC.

DETAILED EMBODIMENTS OF THE INVENTION

Some typical embodiments that reflect features and advantages of the disclosure are described in detail in the subsequent explanations. It shall be understood that the disclosure can have various changes in different embodiments without departing from the scope of the disclosure, and the explanations and the drawings are in essence for the explanation, instead of limiting the disclosure.

Figure 1:
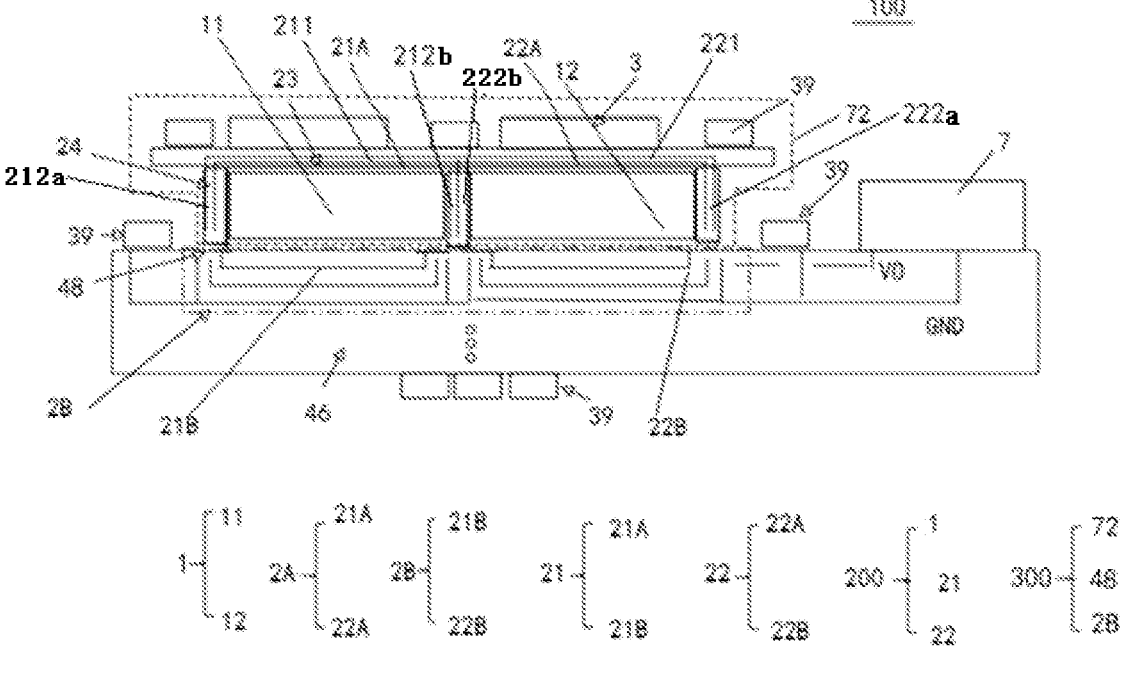
FIG. 1 is a schematic diagram of a power supply system according to the first embodiment of the disclosure.

FIG. 1 is a schematic diagram of a power supply system according to the first embodiment of the disclosure. The power supply system 100 includes a system board 46, a power supply submodule 72, and an intelligent IC load 7, wherein the power supply submodule 72 and the intelligent IC load 7 are disposed on the system board 46. The power supply submodule 72 includes a switch 3 (may be switching device, active device, such as MOS), a magnetic core assembly 1 including a first magnetic column 11 and a second magnetic column 12, and a first winding unit 2A including a first winding portion 21A and a second winding portion 22A. A power supply module 300 for powering the intelligent IC load 7 includes the power supply submodule 72, pins 48 disposed on a lower surface of the power supply submodule 72, and a second winding unit 2B. The second winding unit 2B includes a third winding portion 21B disposed on or in the system board 46 connected to the first winding portion 21A via at least a part of the plurality of pins 48 to form a first winding 21, and a fourth winding portion 22B disposed on or in the system board 46 connected to the second winding portion 22A via at least a part of the plurality of pins 48 to form a second winding 22. The first winding 21 is wound around the first magnetic column 11, and the second winding 22 is wound around the second magnetic column 12. The magnetic core assembly 1, at least the first winding 21 and the second winding 22 form a magnetic element 200. The switch 3 is disposed on the magnetic element 200 and electrically connected to the magnetic element 200. At least one pin of the plurality of pins 48 is an output pin of the power supply module 300, and the supply module 300 powers the intelligent IC load 7 via the output pin. The first winding portion 21A includes a first horizontal winding 211 disposed above the first magnetic column 11, and a first vertical winding 212*a* and a second vertical winding 212*b* respectively at both sides of the first magnetic column 11 and connected to the first horizontal winding 211. The second winding portion 22A includes a second horizontal winding 221 disposed above the second magnetic column 12, and a third vertical winding 222*a* and a fourth vertical winding 222*b* respectively at both sides of the second magnetic column 12 and connected to the second horizontal winding 221.

The pins 48 are disposed on the lower surface of the power supply submodule 72 and the power supply submodule 72 is soldered to the corresponding pad on the system board 46 via the pins 48, such that the first winding portion 21A of the power supply submodule 72 is connected to the third winding portion 21B in the system board 46 to form a complete winding and the second winding portion 22A of the power supply submodule 72 is connected to the fourth winding portion 22B in the system board 46 to form a complete winding.

In the application, the intelligent IC load 7 refers to processor chips for artificial intelligence, data center or big data, such as Central Processing Unit (CPU), Graphics Processing Unit (GPU), Tensor Processing Unit (TPU), or various Application Specific Integrated Circuit (ASIC) chips for artificial intelligent data processing, or other data processing chips for an intelligent accelerator card.

Figure 2:
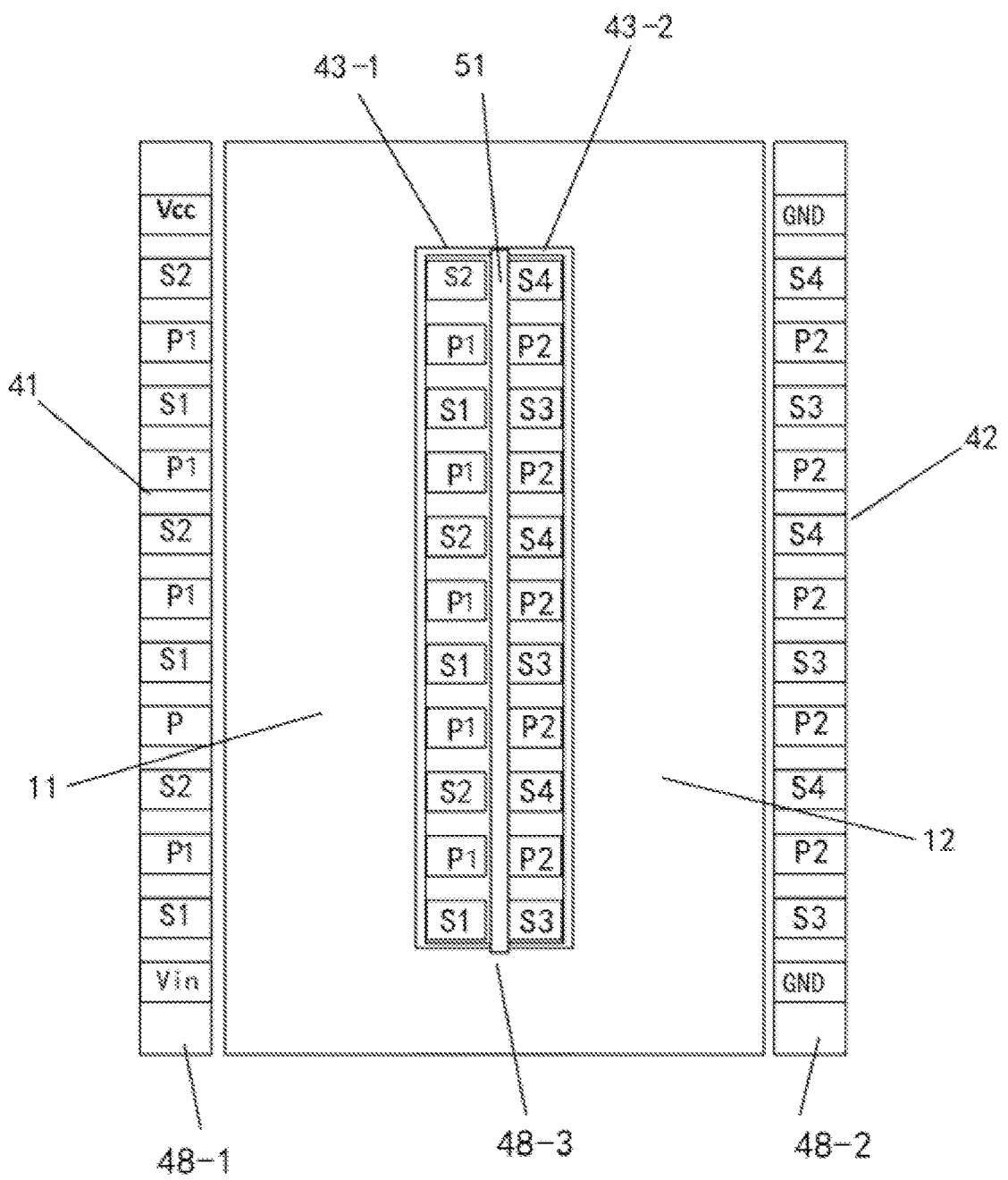
FIG. 2 is a schematic diagram of pads at a bottom of a power supply submodule according to the first embodiment.

FIG. 2 is a schematic diagram of pads at a bottom of a power supply submodule according to the first embodiment. Referring to FIG. 2 and FIG. 1, the ends of the first vertical winding 212a, the second vertical winding 212b, the third vertical winding 222a, and the fourth vertical winding 222b are electrically connected to the pins 48. The first winding 21 may include a first secondary winding with corresponding pads 51. The first winding 21 may further include a second secondary winding with corresponding pads S2. Further, the first winding 21 may include a first primary winding with corresponding pads P1. The second winding 22 may include a third secondary winding with corresponding pads S3. The second winding 22 may further include a fourth secondary winding with corresponding pads S4. Further, the second winding 22 may include a second primary winding with corresponding pads P2. The numbers of turns of the first primary winding and the second primary winding are determined according to a turn ratio. The second secondary winding, the first primary winding, and the first secondary winding are arranged alternatively, and the fourth secondary winding, the second primary winding, and the third secondary winding are arranged alternatively, thereby improving uniformity of currents of the windings and improving efficiency. In addition, the bottom of the power supply submodule 72 may also be provided with a pad Vin (a pad of an input circuit), other signal pads (for signals such as a PWM driving signal, an operating state monitoring signal, or a power management (PM) bus signal), or other pads such as GND. Correspondingly, pads on an upper surface of the system board 46 are arranged corresponding to the arrangement of the pads on the bottom of the power supply submodule 72, thereby realizing the winding connection, current transmission, and signal delivery.

Figure 3:
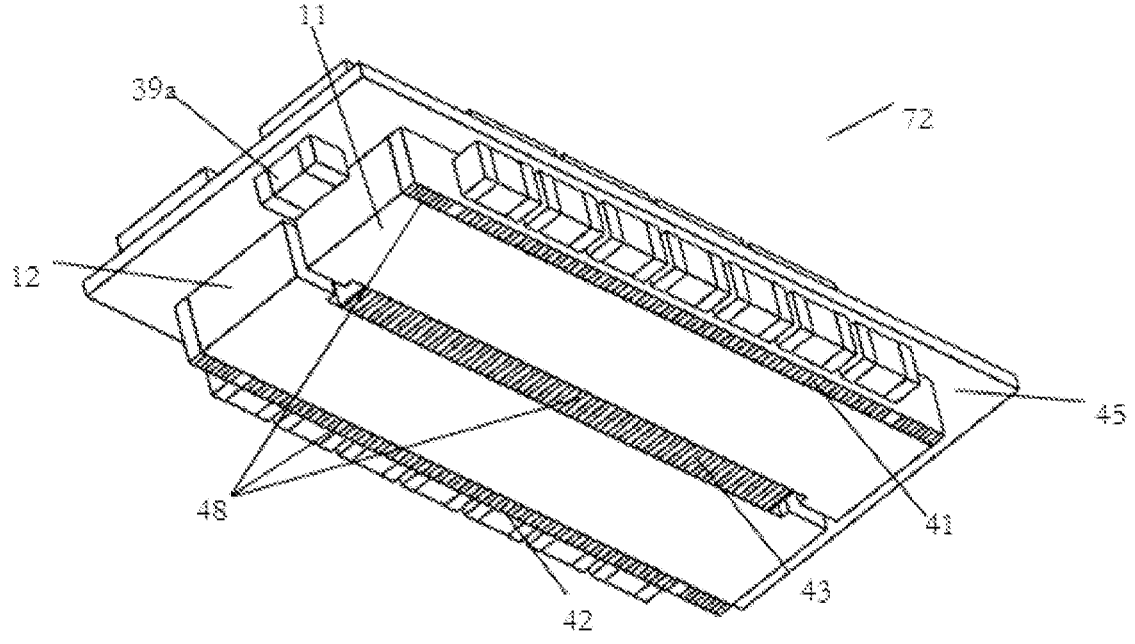
FIG. 3 is a perspective view of a power supply submodule according to the second embodiment of the disclosure.

FIG. 3 is a perspective view of a power supply submodule according to the second embodiment of the disclosure. Referring to FIG. 3 and FIG. 1, in this embodiment, the power supply submodule 72 includes a first magnetic column 11, a second magnetic column 12, a first circuit board 41 on an outer side of the first magnetic column 11, a second circuit board 42 on an outer side of the second magnetic column 12, a third circuit board 43 between the first magnetic column 11 and the second magnetic column 12, and a horizontal winding circuit board 45 on upper surfaces of the first magnetic column 11 and the second magnetic column 12. The first vertical winding 212a and the second vertical winding 212b are disposed on or in the first circuit board 41 and the third circuit board 43, respectively. The third vertical winding 222a and the fourth vertical winding 222b are disposed on or in the second circuit board 42 and the third circuit board 43, respectively. The first horizontal winding 211 and the second horizontal winding 221 are disposed on or in the horizontal winding circuit board 45. In this embodiment, the windings are formed on or in the circuit boards.

In this embodiment, the horizontal winding circuit board 45 includes a first portion on an upper surface of the first magnetic column 11 and a second portion on an upper surface of the second magnetic column 12. The first circuit board 41, the third circuit board 43, and the first portion of the horizontal winding circuit board 45 form a first accommodation space for accommodating the first magnetic column 11. The second circuit board 42, the third circuit board 43, and the second portion of the horizontal winding circuit board 45 form a second accommodation space for accommodating the second magnetic column 12. The third circuit board 43 is shared by the two accommodation spaces. The first circuit board 41 and the third circuit board 43 are lateral sides of the first accommodation space, and the second circuit board 42 and the third circuit board 43 are lateral sides of the second accommodation space. The first portion of the horizontal winding circuit board 45 is the bottom side of the first accommodation space, and the second portion of the horizontal winding circuit board 45 is the bottom side of the second accommodation space. The bottom side of the first accommodation and the pin 48 are at opposite sides of the submodule. The bottom side of the second accommodation and the pin 48 are at opposite sides of the submodule. Openings of both the first accommodation space and the second accommodation space are towards the system board.

Referring to FIG. 3, to arrange as many devices as possible, the horizontal winding circuit board 45 may extend to "fly out" in a horizontal direction, such that an area of the horizontal winding circuit board 45 can be increased. More devices can be arranged on the horizontal winding circuit board 45, and devices, such as capacitors 39a, may also be disposed on a lower surface of the horizontal winding circuit board 45 (i.e., a surface facing the magnetic core).

Figure 4:
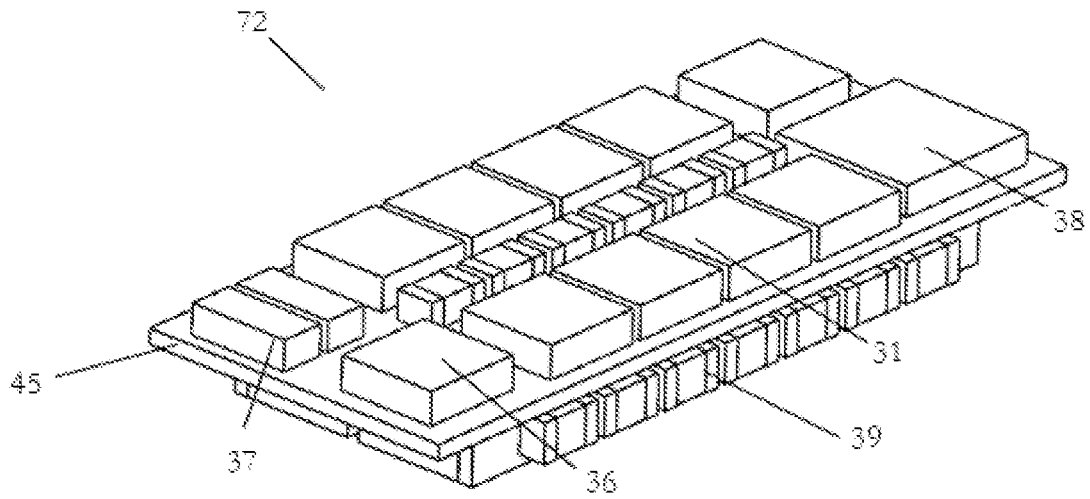
FIG. 4 is a schematic diagram of the arrangement of surface devices on a horizontal winding circuit board.

FIG. 4 is a schematic diagram of the arrangement of devices on a horizontal winding circuit board. In this embodiment, two columns of rectifier devices 31 are disposed in the middle of an upper surface of the horizontal winding circuit board 45. The horizontal winding circuit board 45 has a flyout region extending towards left along a horizontal direction and a flyout region extending towards right along a horizontal direction. The flyout region is a region where the horizontal winding circuit board 45 extends beyond the magnetic core assembly. Primary switches 37, driving devices 36, or controllers 38 may be disposed in the flyout region. In such a way, without expanding the pads region on the system board 46, a space for devices of the power supply submodule 72 is increased, a power density is increased, and occupation of the pads region on the system board 46 is reduced to facilitate user's application.

End faces of the first circuit board 41, the second circuit board 42, and the third circuit board 43 are provided with pins 48, such as pads. FIG. 2 is an arrangement of pads when pads of the power supply submodule are projected on the system board. A first pad 48-1 is a pad on an end face of the first circuit board 41, a second pad 48-2 is a pad on an end face of the second circuit board 42, and a third pad 48-3 is a pad on an end face of the third circuit board 43. The first pad 48-1 is provided with a signal terminal Vcc, a power supply input terminal VIN, and terminals of the first winding 21. The second pad 48-2 is provided with a ground terminal GND and the terminals of the second winding 22. The third circuit board 43 between the first magnetic column 11 and the second magnetic column 12 may be formed by two separate circuit boards 43-1 and 43-2, which are connected through a first bonding layer 51, to form an arrangement structure of the terminals of the third circuit board 43 shown in FIG. 2. The second vertical winding 212*b* and the fourth vertical winding 222*b* are disposed on or in the two separate circuit boards 43-1 and 43-2, respectively. The third pad 48-3 has two columns of symmetric pad terminals. Two columns of the third pads are provided with the terminals of the first winding 21 and the second winding 22 correspondingly. Pads corresponding to the first pad 48-1, the second pad 48-2, and the third pad 48-3 are disposed on the system board.

Figure 5:
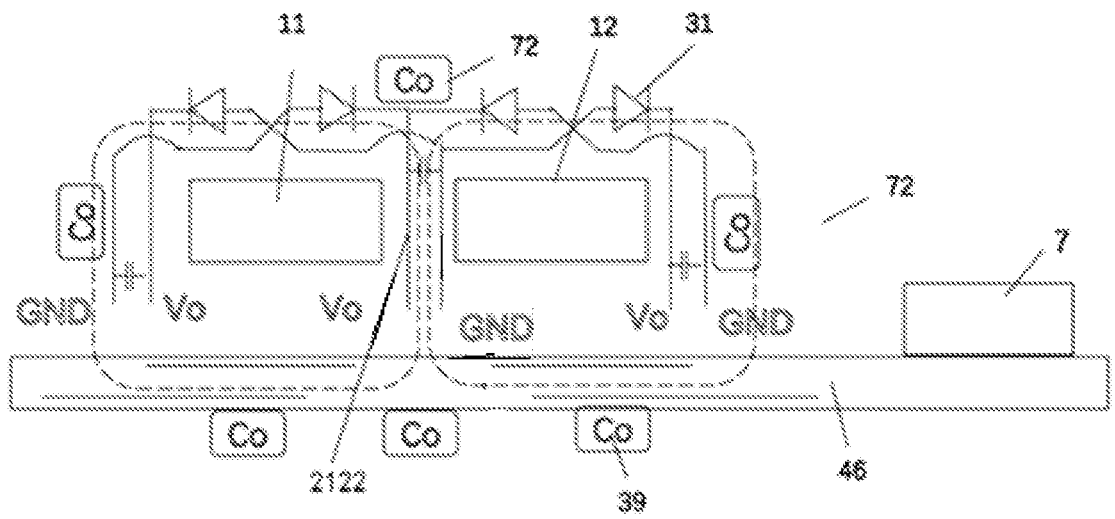
FIG. 5 is a schematic diagram of a power supply system according to the third embodiment of the disclosure.

FIG. 5 is a schematic diagram of a power supply system according to the third embodiment of the disclosure. In this embodiment, the power supply module is similar to the power supply module shown in FIG. 3, and the same reference signs represent the same component, structure, and function, so the details are not described here. Referring to FIG. 5 in combination with FIGS. 1 and 3, in this embodiment, the second vertical winding 212*b* and the fourth vertical winding 222*b* between the first magnetic column 11 and the second magnetic column 12 can be reused integrally to form a shared winding 2122, such that the types and the number of pads on the system board 46 can be reduced. Specifically, the second vertical winding 212*b* and the fourth vertical winding 222*b* on the third circuit board 43 share one metal conductor. Power devices such as the rectifier devices 31 may be disposed above the first magnetic column 11 or the second magnetic column 12, thereby facilitating heat dissipation. Capacitors 39, such as output capacitors Co, may be disposed below the system board 46. In such a way, the trace of the windings in the system board is simple and the user's application is convenient. A connection impedance of the capacitors and the windings is smaller and a power density is improved because the output capacitors Co can be disposed on a rear face of the system board with a closer connection with the windings.

Figure 6:
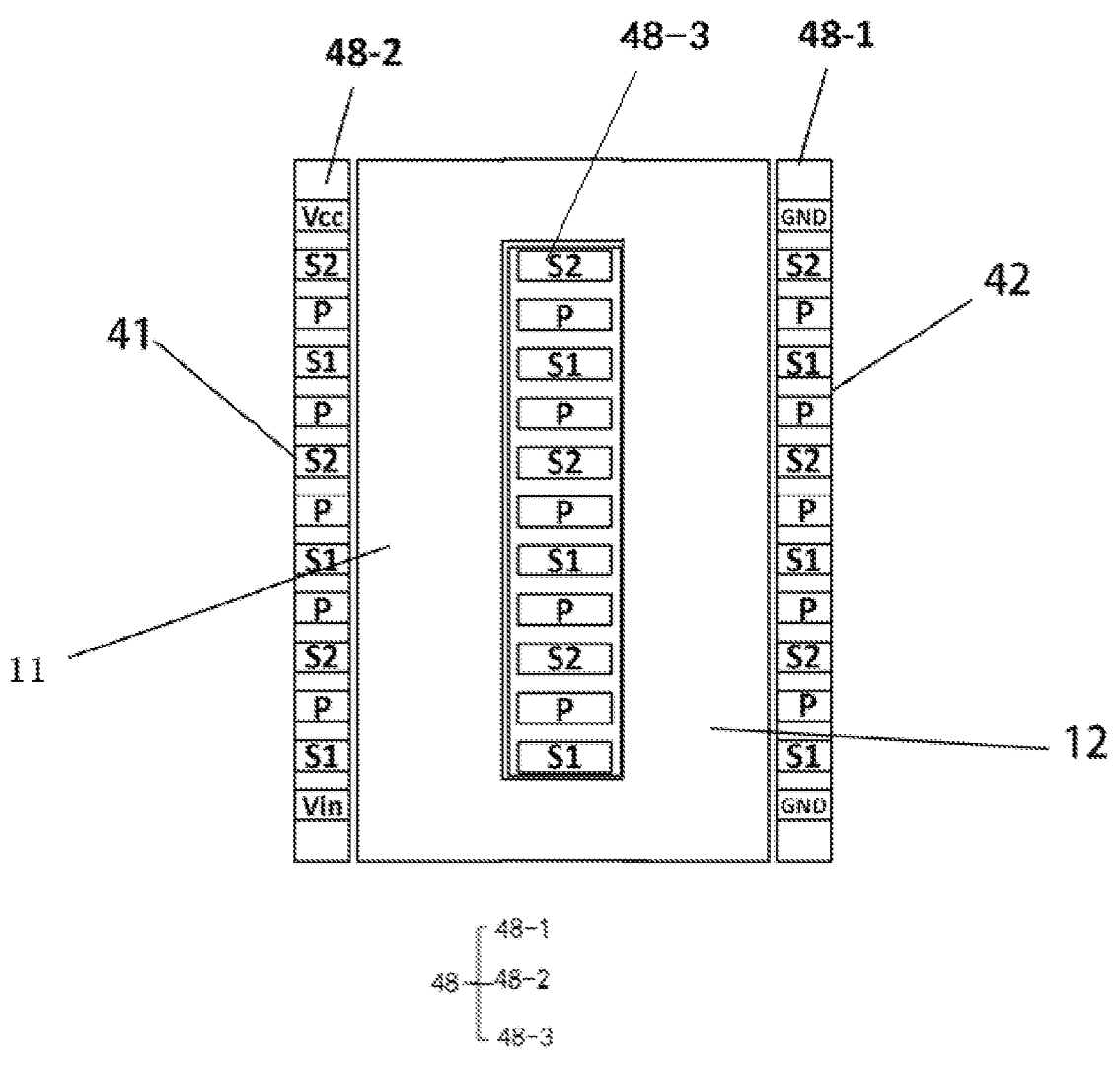
FIG. 6 is a schematic diagram of pads at a bottom of a power supply module according to the third embodiment of the disclosure.

FIG. 6 is a schematic diagram of pads at a bottom of a power supply module according to the third embodiment of the disclosure. Referring to FIG. 6 in combination with FIGS. 1 and 3, the second vertical winding 212*b* and the fourth vertical winding 222*b* on the third circuit board 43 are shared. The third pad 48-3 on a lower end face of the third circuit board 43 corresponds to the respective combination of the pads P1 and P2, S1 and S3, and S2 and S4 on left and right of the pad 48-3 in FIG. 2. As compared to the types of the pads in FIG. 2, the types of the pads may be largely reduced. The third pad 48-3 in this embodiment has one column of pad terminals, and structure and process are simplified to facilitate the user's application.

Figure 7:
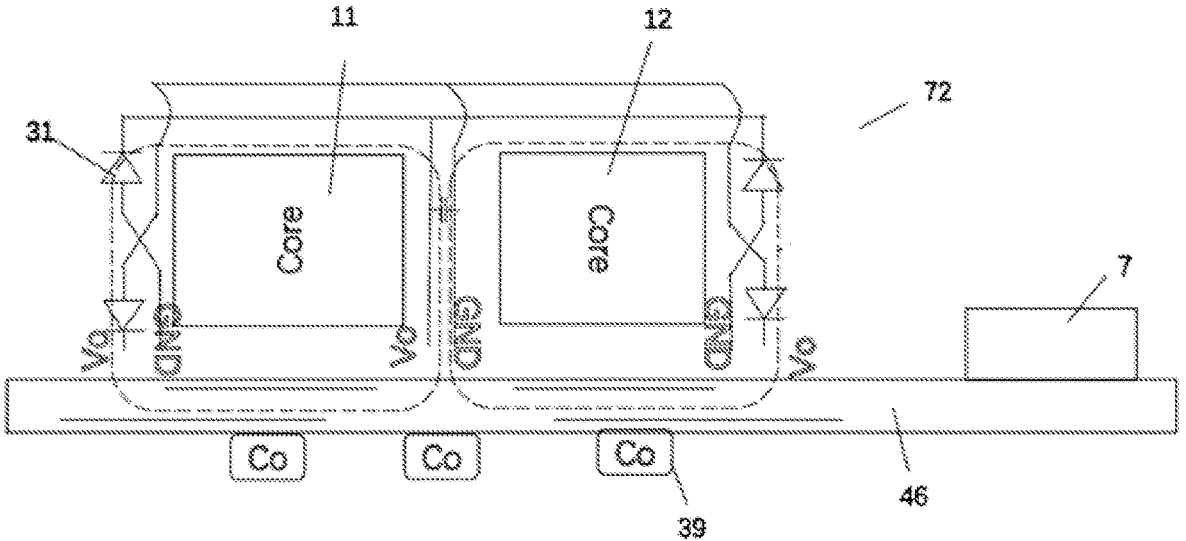
FIG. 7 is a schematic diagram of a power supply system according to the fourth embodiment of the disclosure.
Figure 8:
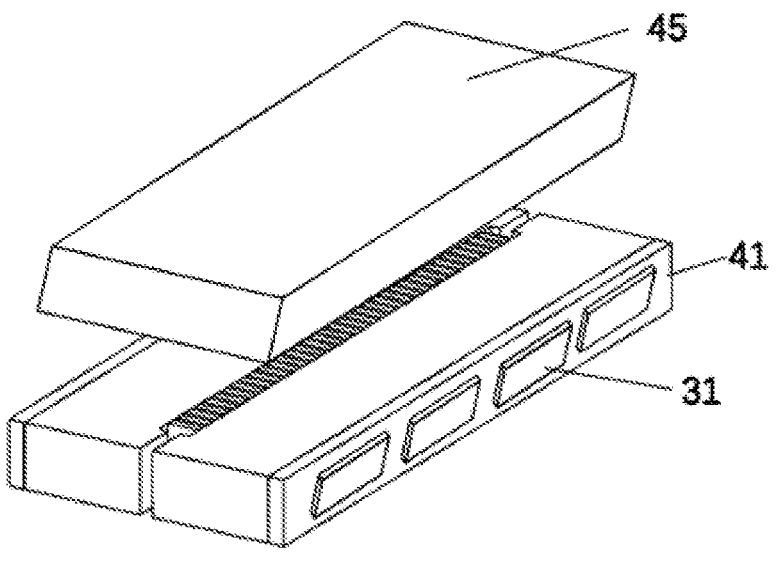
FIG. 8 is a perspective view of a power supply submodule in the power supply system of the fourth embodiment.
Figure 9:
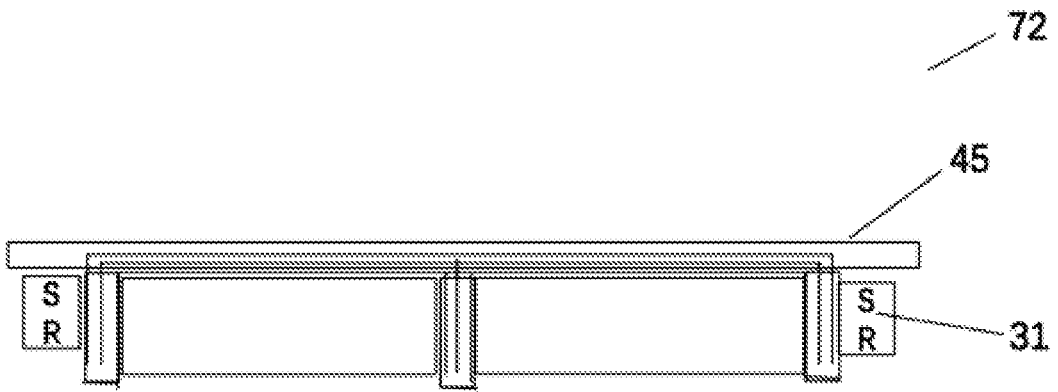
FIG. 9 is a side view of the power supply submodule in the power supply system of the fourth embodiment.

FIG. 7 is a schematic diagram of a power supply system according to the fourth embodiment of the disclosure. FIG. 8 is a perspective view of a power supply submodule in the power supply system according to the fourth embodiment. FIG. 9 is a side view of the power supply submodule in the power supply system according to the fourth embodiment. In this embodiment, a plurality of first rectifier devices 31 may be disposed on outer sides of the first magnetic column 11 and the second magnetic column 12, such that the structure may be compacter. As shown in FIG. 8, the first rectifier devices 31 are disposed on the outer side of the first circuit board 41.

Figure 10:
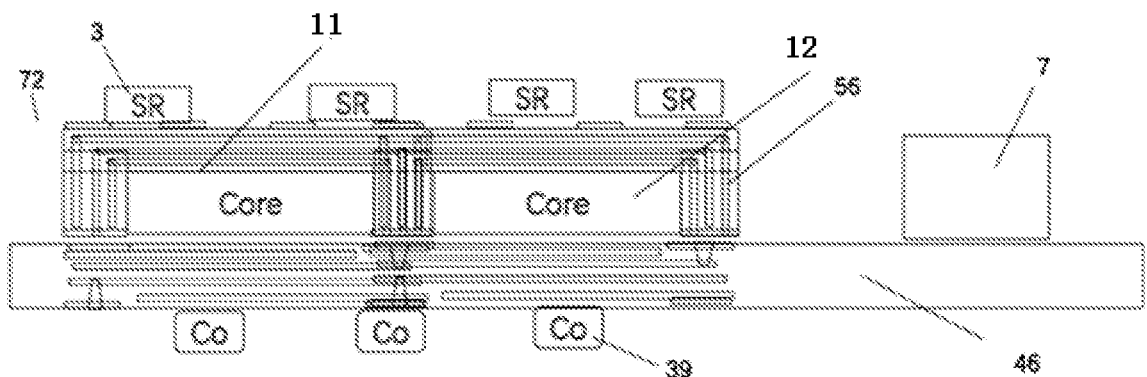
FIG. 10 is a schematic diagram of a power supply system according to the fifth embodiment of the disclosure.
Figure 11:
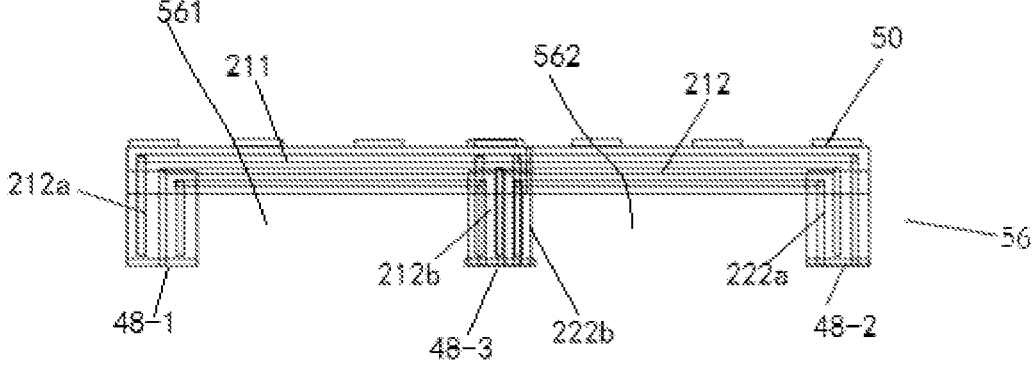
FIG. 11 is a structural diagram of a grooved circuit board in the power supply system of FIG. 10.

FIG. 10 is a schematic diagram of a power supply system according to the fifth embodiment of the disclosure. FIG. 11 is a structural diagram of a grooved circuit board in the power supply system of FIG. 10. In this embodiment, the power supply module is similar to the power supply module shown in FIGS. 2 to 8, and the same reference signs represent the same component, structure, and function, so the details are not described here. In this embodiment, the power supply module has a grooved circuit board 56 having a lower surface provided with a first groove 561 for accommodating the first magnetic column 11 and a second groove 562 for accommodating the second magnetic column 12. A bottom side of the first groove 561 is provided with the first horizontal winding 211, and two lateral sides of the first groove 561 are provided with the first vertical winding 212*a* and the second vertical winding 212*b*. The first horizontal winding 211, the first vertical winding 212*a*, and the second vertical winding 212*b* wrap three sides of the first magnetic column 11. A bottom side of the second groove 562 is provided with the second horizontal winding 221, and two lateral sides of the second groove 562 are provided with the third vertical winding 222*a* and the fourth vertical winding 222*b*. The second horizontal winding 221, the third vertical winding 222*a*, and the fourth vertical winding 222*b* wrap three sides of the second magnetic column 12.

The lower surface of the grooved circuit board 56 is provided with a plurality of pins 48, such as pads 48-1, 48-2, and 48-3. The plurality of pins 48 are electrically connected to the first vertical winding 212*a*, the second vertical winding 212*b*, the third vertical winding 222*a*, and the fourth vertical winding 222*b* correspondingly, and electrically connected to the system board 46.

An upper surface of the grooved circuit board 56 may also be provided with pads 50 for connecting electronic components, such as switching devices 3 or passive elements. The first magnetic column 11 and the second magnetic column 12 are disposed in the first groove 561 and the second groove 562 to form a power supply submodule 72, thereby facilitating reducing the number of components, simplifying the process, and having better process stability especially when a grooved depth on the PCB is small.

Figure 12:
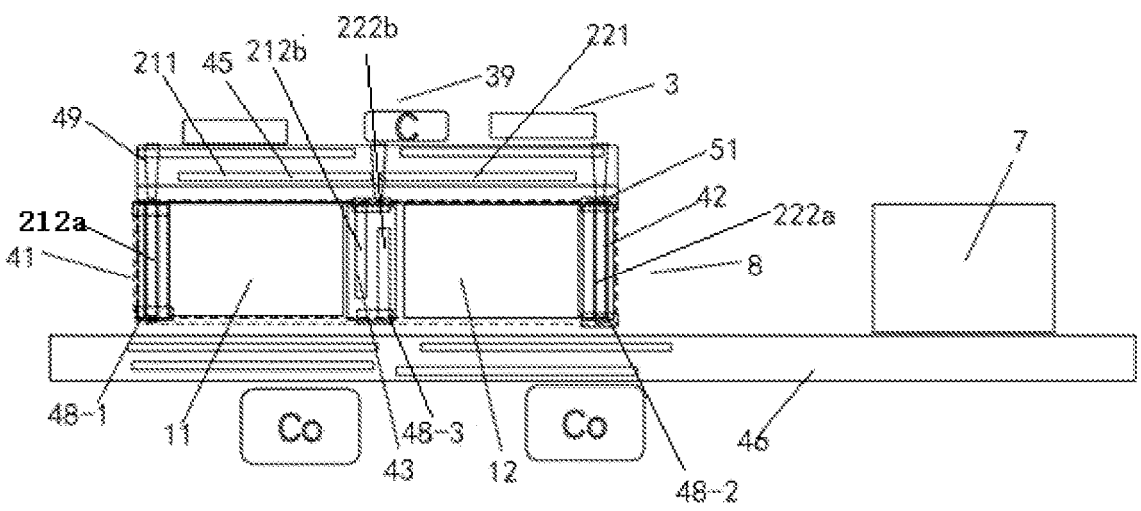
FIG. 12 is a schematic diagram of a power supply system according to the sixth embodiment of the disclosure.

FIG. 12 is a schematic diagram of a power supply system according to the sixth embodiment of the disclosure. In this embodiment, the power supply module is similar to the power supply module shown in FIGS. 2-5 and 10, and the same reference signs represent the same component, structure, and function, so the details are not described here. In this embodiment, the first circuit board 41, the first magnetic column 11, the third circuit board 43, the second magnetic column 12, and the second circuit board 42 form a pre-package 8 shown in a dashed box of the figure.

In this embodiment, a bonding layer 51 adheres on the pre-package 8, the horizontal winding circuit board 45 is disposed on the bonding layer 51, and the horizontal windings in the horizontal winding circuit board 45 are electrically connected to the vertical windings in the first circuit board 41, the third circuit board 43, and the second circuit board 42 through a plurality of conductive vias 49. For example, the horizontal winding circuit board 45 is electrically connected to the first vertical winding 212*a*, the second vertical winding 212*b*, the third vertical winding 222*a*, and the fourth vertical winding 222*b*. In this embodiment, the bonding layer 51 may be an insulated prepreg. Terminals are provided on the upper end faces of the first circuit board 41, the third circuit board 43, and the second circuit board 42, and electrically connected to the vertical windings in the circuit boards, respectively. The horizontal winding circuit board 45 is bonded to the upper end faces of the first circuit board 41, the third circuit board 43, and the second circuit board 42 via the insulating bonding layer 51, and the plurality of conductive vias 49 passes through the bonding layer to electrically connect the horizontal windings in the horizontal winding circuit board 45 to the vertical windings on the first circuit board 41, the third circuit board 43, and the second circuit board 42 to form preset windings, such as inverted "U"-shaped windings. The pad 48-1 is disposed on a lower end face of the first circuit board 41, the pad 48-2 is disposed on a lower end face of the second circuit board 42, and the pad 48-3 is disposed on a lower end face of the third circuit board 43. The pad 48-1, 48-2, and 48-3 are to be soldered to the system board 46, thereby forming a complete winding. With the arrangement, the respective component of the power supply is with compact structure, small volume, high reliability, simple process, and low cost.

Figure 13:
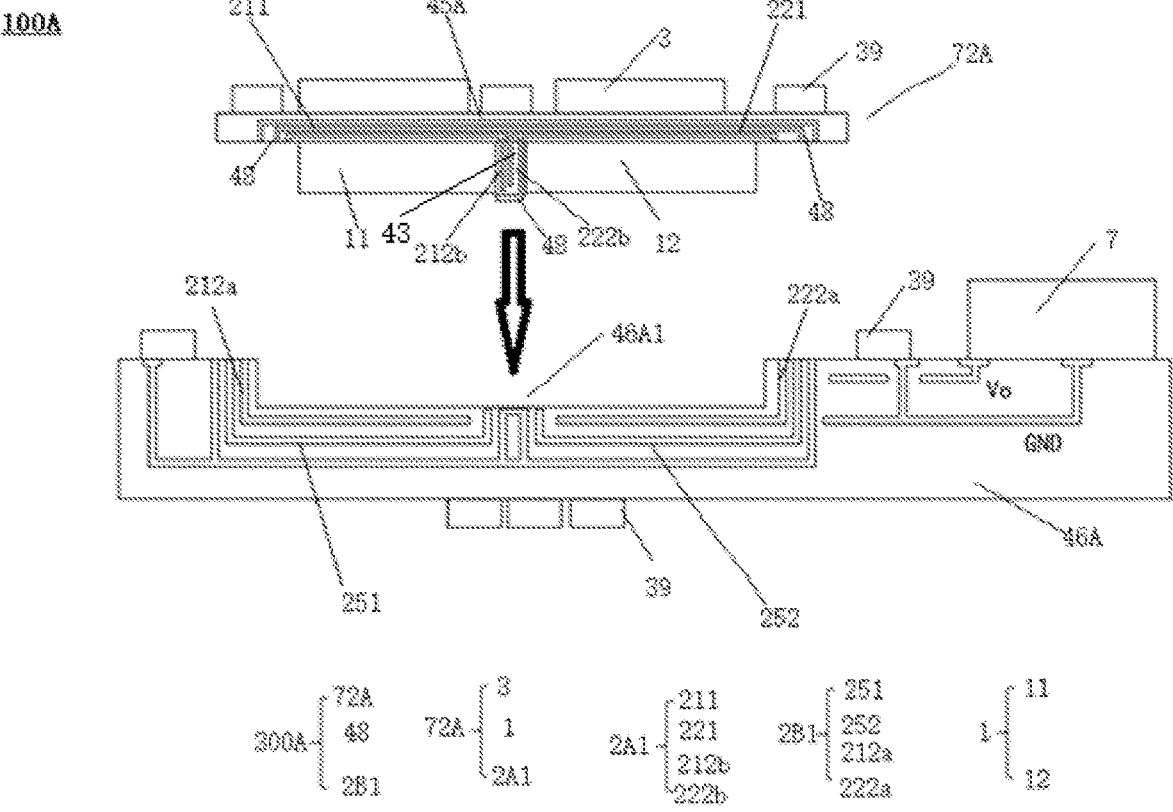
FIG. 13 is an assembly diagram of a power supply system according to the seventh embodiment of the disclosure.
Figure 14:
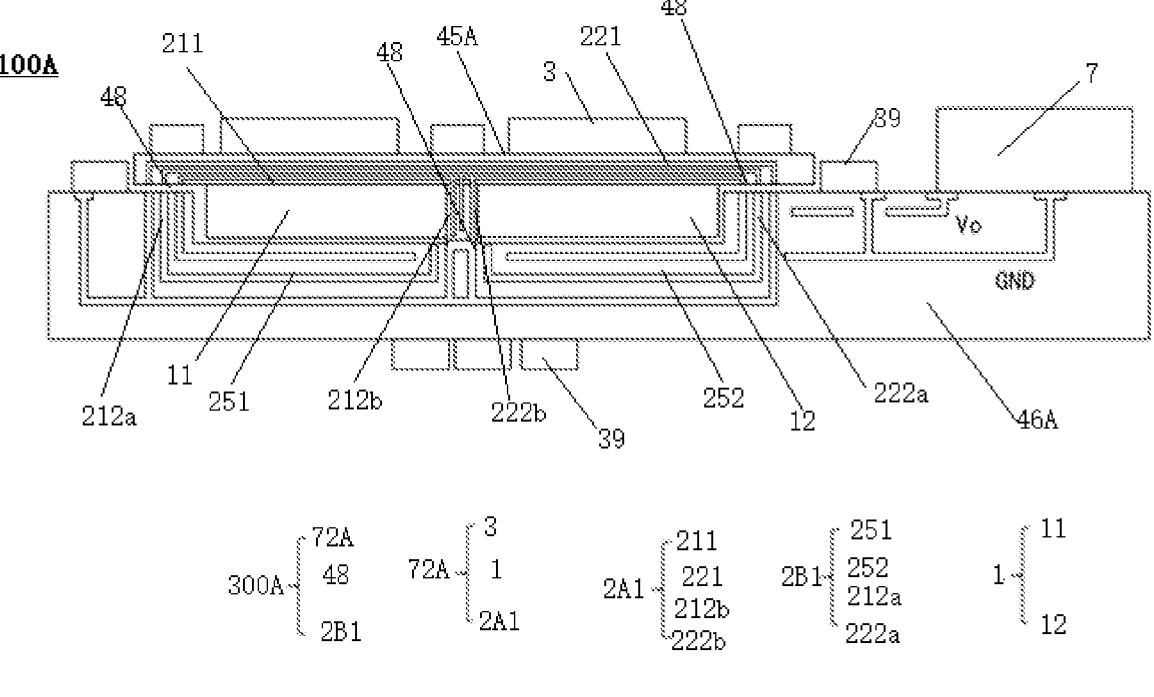
FIG. 14 is a structural diagram of the power supply system according to the seventh embodiment of the disclosure.

FIG. 13 is an assembly diagram of a power supply system according to the seventh embodiment of the disclosure. FIG. 14 is a structural diagram of the power supply system according to the seventh embodiment of the disclosure. In this embodiment, the power supply module is similar to the power supply module shown in FIGS. 2-8, and the same reference signs represent the same component, structure, and function, so the details are not described here. In this embodiment, the power supply system 100A includes a system board 46A, a power supply submodule 72A, and an intelligent IC load 7, wherein the power supply submodule 72A and the intelligent IC load 7 are disposed on the system board 46A. The power supply submodule 72A includes a switch 3, a first magnetic column 11, a second magnetic column 12, and a first winding unit 2A1. The first winding unit 2A1 includes a first horizontal winding 211, a second horizontal winding 221, a second vertical winding 212b, and a fourth vertical winding 222b. A power supply module 300A includes the power supply submodule 72A, pins 48, and a second winding unit 2B1. The second winding unit 2B1 includes a first vertical winding 212a, a third vertical winding 222a, a third horizontal winding 251, and a fourth horizontal winding 252. Here the third horizontal winding 251 and the fourth horizontal winding 252 are horizontal windings in the system board. The first vertical winding 212a and the third vertical winding 222a can be manufactured by the way of conductive vias. The third horizontal winding 251 and the fourth horizontal winding 252 may be implemented by a conductive copper layer. The system board 46A is provided with a third groove 46A1 for accommodating the first magnetic column 11 and the second magnetic column 12. The third horizontal winding 251 and the fourth horizontal winding 252 are below the third groove 46A1. The third horizontal winding 251 is below the first magnetic column 11 and the fourth horizontal winding 252 is below the second magnetic column 12. In this embodiment, the first magnetic column 11 and the second magnetic column 12 are arranged parallel to each other in the same plane in the third groove 46A1.

Referring to FIG. 13, the first vertical winding 212a and the third vertical winding 222a are at the left and right sides of the third groove 46A1, respectively. The second vertical winding 212b and the fourth vertical winding 222b are disposed on or in a third circuit board 43. The first horizontal winding 211 and the second horizontal winding 221 are disposed on or in a horizontal winding circuit board 45A.

A plurality of pins 48 is disposed on one side of the horizontal winding circuit board 45A facing the system board 46A and is arranged to correspond to the second vertical winding 212b, the fourth vertical winding 222b, the first vertical winding 212a, and the third vertical winding 222a. Windings in the power supply submodule 72A are soldered to windings of the system board 46A to form a complete winding via the corresponding pins 48. For example, the first horizontal winding 211, the first vertical winding 212a, the third horizontal winding 251, and the second vertical winding 212b are connected to form a complete first winding 21. The power supply submodule

72A is embedded in the system board 46A, such that the height of the power supply module can be further reduced.

Figure 15:
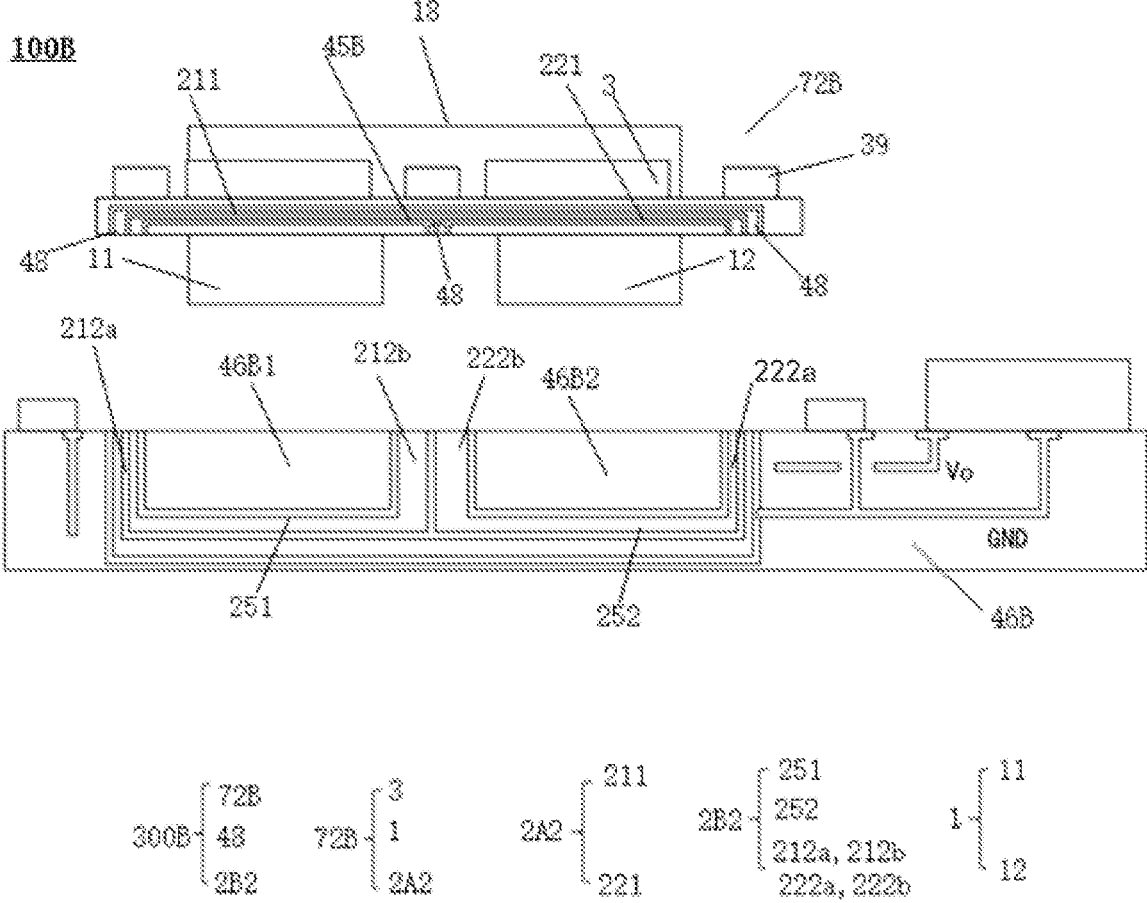
FIG. 15 is an assembly diagram of a power supply system according to the eighth embodiment of the disclosure.
Figure 16:
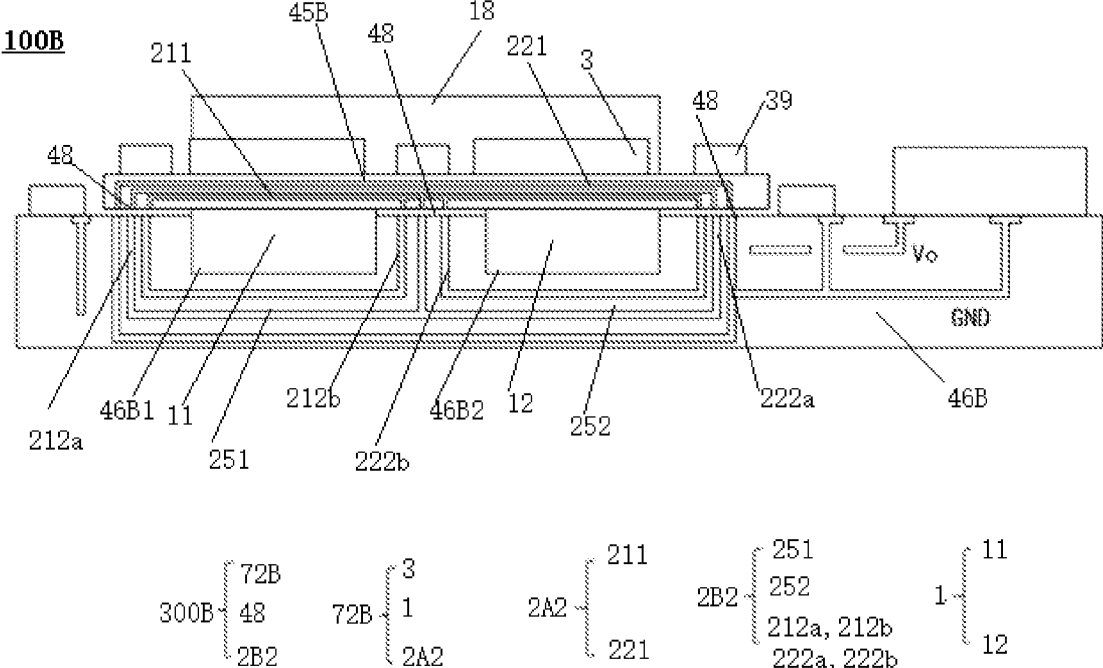
FIG. 16 is a structural diagram of the power supply system according to the eighth embodiment of the disclosure.

FIG. 15 is an assembly diagram of a power supply system according to the eighth embodiment of the disclosure. FIG. 16 is a structural diagram of the power supply system according to the eighth embodiment of the disclosure. In this embodiment, the power supply module is similar to the power supply module shown in FIGS. 2 to 8, and the same reference signs represent the same component, structure, and function, so the details are not described here. In this embodiment, referring to FIG. 15, a system board 46B is provided with a fourth groove 46B1 for accommodating the first magnetic column 11 and a fifth groove 46B2 for accommodating the second magnetic column 12. A power supply module 100B includes a power supply submodule 72B embedded into the system board 46B. The power supply submodule 72B includes a switch 3, a magnetic core assembly 1, and a first winding unit 2A2. The first winding unit 2A2 includes a first horizontal winding 211 and a second horizontal winding 221. A power supply module 300B includes the power supply submodule 72B, pins 48, and a second winding unit 2B2. The second winding unit 2B2 includes a first vertical winding 212a, a second vertical winding 212b, a third vertical winding 222a, a fourth vertical winding 222b, a third horizontal winding 251, and a fourth horizontal winding 252.

The first vertical winding 212a, the second vertical winding 212b, the third vertical winding 222a, the fourth vertical winding 222b, the third horizontal winding 251, and the fourth horizontal winding 252 are on or in the system board 46B. The first horizontal winding 211 and the second horizontal winding 221 are on or in a horizontal winding circuit board 45B. The second vertical winding 212b and the fourth vertical winding 222b are between the fourth groove 46B1 and the fifth groove 46B2. The third horizontal winding 251 and the fourth horizontal winding 252 are below the first magnetic column 11 and the second magnetic column 12, respectively. The second vertical winding 212b and the fourth vertical winding 222b are between the first magnetic column 11 and the second magnetic column 12. The second vertical winding 212b is at the right of the first magnetic column 11. The fourth vertical winding 222b is at the left of the second magnetic column 12.

A plurality of pins 48 are disposed on one side of the horizontal winding circuit board 45B facing the system board 46B and are arranged to correspond to the first vertical winding 212a, the second vertical winding 212b, the third vertical winding 222a, and the fourth vertical winding 222b. The plurality of pins 48 is on a surface of the horizontal winding circuit board 45B, such that the respective pins 48 of the power supply submodule 72B can be in a common plane, i.e., on the horizontal winding circuit board 45B. The corresponding pads on the system board 46B and other devices on the system board, such as pads of the intelligent load IC 7, can be in a common plane, to facilitate soldering.

The first magnetic column 11 and the second magnetic column 12 are embedded in the first groove 561 and the second groove 562 respectively, the power supply submodule 72B is disposed on the system board 46B, and the windings in the power supply submodule 72B are soldered to the windings on the system board 46B to form a complete winding via the corresponding pins 48.

Figure 17:
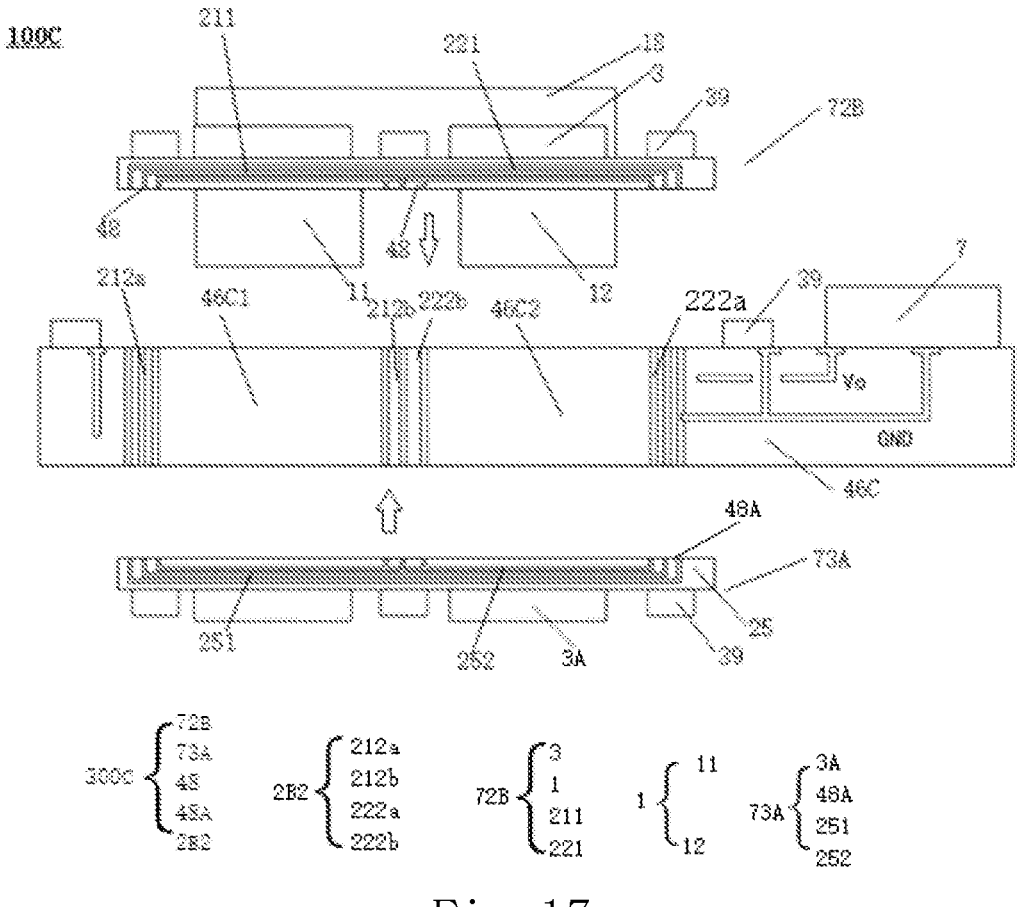
FIG. 17 is an assembly diagram of a power supply system according to the ninth embodiment of the disclosure.
Figure 18:
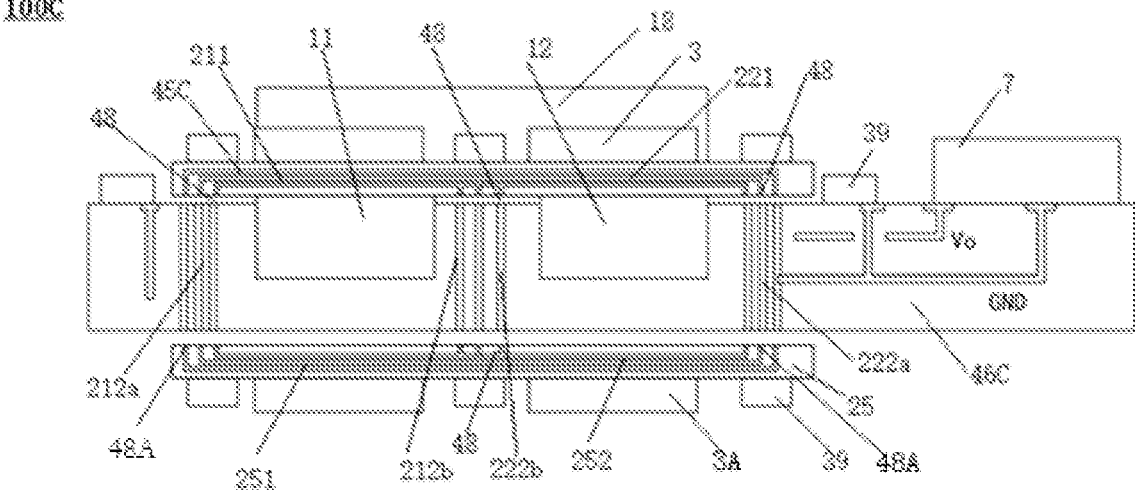
FIG. 18 is a structural diagram of the power supply system according to the ninth embodiment of the disclosure.

FIG. 17 is an assembly diagram of a power supply system according to the ninth embodiment of the disclosure. FIG. 18 is a structural diagram of the power supply system according to the ninth embodiment of the disclosure. In this embodiment, the power supply module is similar to the power supply module shown in FIGS. 2 to 8, and the same reference signs represent the same component, structure, and function, so the details are not described here. In this embodiment, as shown in FIG. 17, a system board 46C of the power supply system 100C is provided with a first through hole 46C1 and a second through hole 46C2 penetrating the system board 46C. The first through hole 46C1 accommodates the first magnetic column 11 and the second through hole 46C2 accommodates the second magnetic column 12. A power supply module 300C includes a first power supply submodule 72B, a second power supply submodule 73A, pins 48, and a second winding unit 2B2. The first power supply submodule 72B includes a switch 3, a magnetic core assembly 1, a first horizontal winding 211, and a second horizontal winding 221. The second winding unit 2B2 includes a first vertical winding 212a, a second vertical winding 212b, a third vertical winding 222a, and a fourth vertical winding 222b. The second power supply submodule 73A includes a switch 3A, a pin 48A, a third horizontal winding 251, and a fourth horizontal winding 252. The first vertical winding 212a, the second vertical winding 212b, the third vertical winding 222a, and the fourth vertical winding 222b are disposed on or in a system board 46B. The first horizontal winding 211 and the second horizontal winding 221 are disposed on or in a horizontal winding circuit board 45C. The third horizontal winding 251 and the fourth horizontal winding 252 are disposed on or in a fourth circuit board 25. The first power supply submodule 72B is above the system board 46B, the second power supply submodule 73A is below the system board 46B, and the first power supply submodule 72B corresponds to the second power supply submodule 73A vertically. A plurality of pins 48A is disposed on one surface of the fourth circuit board 25 facing the system board 46. The first power supply submodule 72B is soldered to an upper surface of the system board 46C via the pins 48, and the second power supply submodule 73A is soldered to a lower surface of the system board 46C via the pin 48A, such that windings of the first power supply submodule 72B and the second power supply submodule 73A are electrically connected to the windings on or in the system board.

The first magnetic column 11 and the second magnetic column 12 of the first power supply submodule 72B are embedded in the first through hole 46C1 and a second through hole 46C2 respectively. The second power supply submodule 73A is installed below the first magnetic column 11 and the second magnetic column 12, as shown in FIG. 18. Such structure can further reduce the protruding height of the power supply module above one side of the system board 46C and simplify the structure of the windings on or in the system board 46C. For example, it will be enough to only manufacture the windings of a vertical portion. In addition, switching devices (switches) can be disposed on upper and lower sides of the first magnetic columns 11 and 12, and the arrangement of the switching devices is more flexible, thereby further facilitating arrangement of the devices and the windings and reducing connection loss and heat dissipation of the switches 3 and switches 3A.

Figure 19:
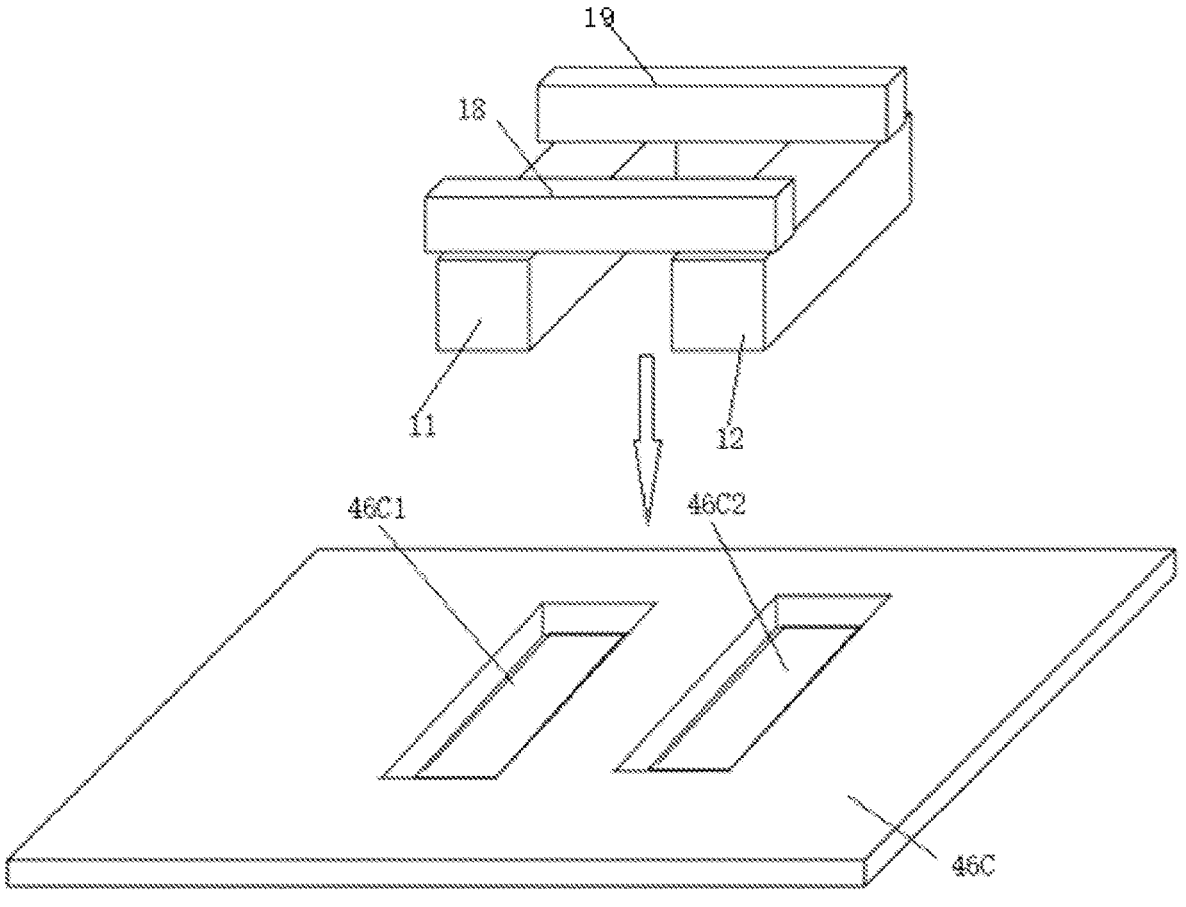
FIG. 19 is a perspective view of the power supply system shown in FIGS. 15 to 18.

FIG. 19 is a perspective view of the power supply system shown in FIGS. 15 to 18. A first magnetic cover 18 and a second magnetic cover 19 are disposed on the first magnetic column 11 and the second magnetic column 12, across between the first magnetic column 11 and the second magnetic column 12, and parallel to each other. The first magnetic cover 18, the second magnetic cover 19, the first magnetic column 11 and the second magnetic column 12 are connected to form a magnetic loop. As the first magnetic cover 18 and the second magnetic cover 19 are disposed on the first magnetic column 11 and the second magnetic column 12, the first magnetic cover plate 18 and the second magnetic cover plate 19 do not need to be embedded in the system board 46C, thereby reducing a grooved area of the system board 46C and improving the strength of the system board 46C, or facilitating user's application.

Figure 20:
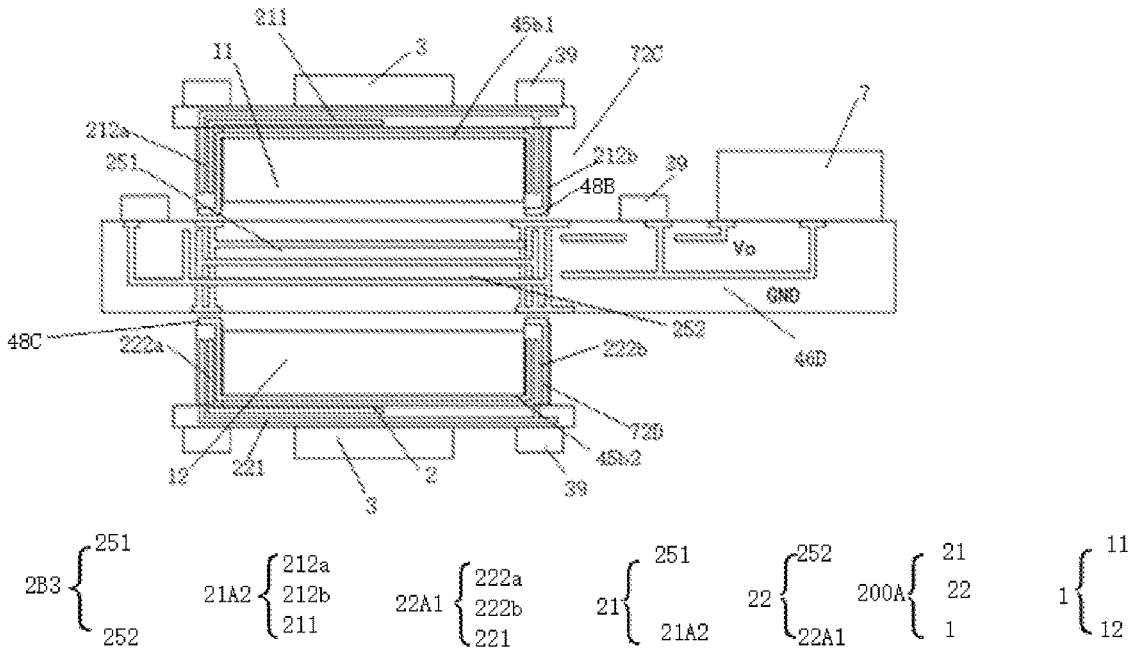
FIG. 20 is a schematic diagram of a power supply system according to the tenth embodiment of the disclosure.

FIG. 20 is a schematic diagram of a power supply system according to the tenth embodiment of the disclosure. In this embodiment, the power supply module is similar to the power supply module shown in FIGS. 2 to 8, and the same reference signs represent the same component, structure, and function, so the details are not described here. In this embodiment, the intelligent IC load 7 is disposed on a system board 46D. The power supply module includes a third power supply submodule 72C disposed on an upper surface of the system board 46D, a fourth power supply submodule 72D disposed on a lower surface of the system board 46D and opposite to the third power supply submodule 72C, a plurality of first pins 48B disposed on a lower surface of the third power supply submodule 72C, a plurality of second pins 48C disposed on an upper surface of the fourth power supply submodule 72D, and a second winding unit 2B3 disposed in the system board 46D. The third power supply submodule 72C includes a first switch 3B, a first magnetic column 11, and a first winding portion 21A2 wound around the first magnetic column 11. The fourth power supply submodule 72D includes a second switch 3C, a second magnetic column 12, and a second winding portion 22A1 wound around the second magnetic column 12. The second winding unit 2B3 includes a third winding portion 251 below the first magnetic column 11 and connected to the first winding portion 21A2 to form a first winding 21 via at least a part of the plurality of first pins 48B, and a fourth winding portion 252 above the second magnetic column and connected to the second winding portion 22A1 to form a second winding 22 via at least a part of the plurality of second pins 48C. The first magnetic column 11, the second magnetic column 12, at least the first winding 21, and the second winding 22 form a magnetic element. The first switch 3B and the second switch 3C are disposed on and electrically connected to a magnetic element 200A. The first winding portion 21A2 includes a first vertical winding 212a, a second vertical winding 212b, and a first horizontal winding 211. The second winding portion 22A1 includes a third vertical winding 222a, a fourth vertical winding 222b, and a second horizontal winding 221.

The third power supply submodule 72C and the fourth power supply submodule 72D may be of completely the same structure, such that the types of power supply submodules are reduced and the structure of the power supply submodules may also be simplified. Outputs of the formed power supply module for powering the intelligent IC load 7 may be disposed on the system board 46D, i.e., at a middle position between the third power supply submodule 72C and the fourth power supply submodule 72D, such that outputs are more symmetric, to facilitate improving output efficiency.

Figure 21:
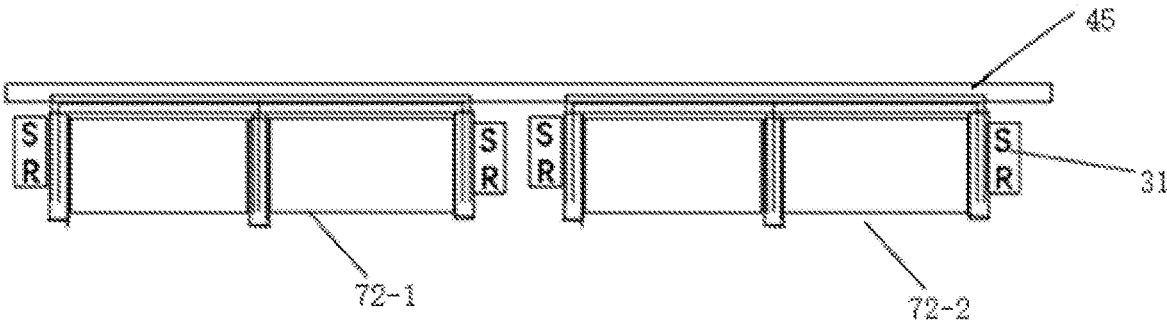
FIG. 21 is a schematic diagram of a power supply submodule according to the eleventh embodiment of the disclosure.
Figure 22:
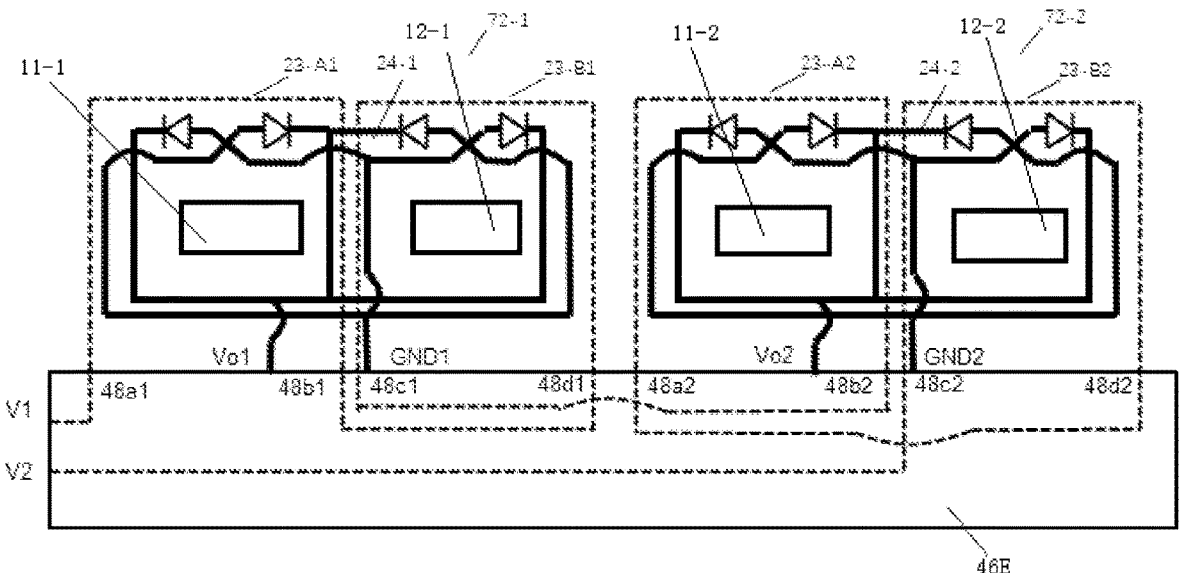
FIG. 22 is a structural diagram of a circuit of the power supply submodule according to the eleventh embodiment of the disclosure.

FIG. 21 is a schematic diagram of a power supply submodule according to the eleventh embodiment of the disclosure. FIG. 22 is a structural diagram of a circuit of the power supply submodule according to the eleventh embodiment of the disclosure. In this embodiment, the power supply module includes two completely same power supply submodules, which are a first power supply submodule 72-1 and a second power supply submodule 72-2, respectively. Structures of the first power supply submodule 72-1 and the second power supply submodule 72-2 are completely the same as that of the power supply submodule 72 in the first embodiment. Of course, the power supply submodules may use the power supply submodules in the seventh to tenth embodiments. Of course, the number of power supply submodules is not limited to two. Referring to FIG. 21 again, a single horizontal winding circuit board 45 is connected to a plurality of vertical winding circuit boards, thereby realizing the integration of the plurality of power supply submodules, such as the first power supply submodule 72-1 and the second power supply submodule 72-2. The plurality of power supply modules is operated in parallel, thereby enlarging power, making the structure compact, and reducing an occupying space of the system board 46. The height and volume of the modules are further reduced, thereby facilitating enlarging power and flexible application.

Referring to FIG. 22, a first power supply submodule 72-1 and a second power supply submodule 72-2 are soldered to the system board 46E. Windings of each power supply submodule include primary windings and secondary windings. Explanations are made by taking the first power supply submodule 72-1 and the second power supply submodule 72-2 as an example. The first power supply submodule 72-1 includes a first magnetic column 11-1 and a second magnetic column 12-1. The primary winding 23-A1 is wound around the first magnetic column 11-1 and the primary winding 23-B1 is wound around the second magnetic column 12-1. The second power supply submodule 72-2 has a first magnetic column 11-2 and a second magnetic column 12-2. The primary winding 23-A2 is wound around the first magnetic column 11-2 and the primary winding 23-B2 is wound around the second magnetic column 12-2. Lower ends of the primary windings 23-A1, 23-B1, 23-A2, and 23-B2 are provided with terminals for electrical connection with the system board 46E. The lower end of the primary winding 23-A1 is provided with primary terminals 48a1 and 48b1, the lower end of the primary winding 23-B1 is provided with primary terminals 48c1 and 48d1, the lower end of the primary winding 23-A2 is provided with primary terminals 48a2 and 48b2, and the lower end of the primary winding 23-B2 is provided with primary terminals 48c2 and 48d2. The primary terminals of the primary windings are electrically connected to the system board 46E. The first power supply submodule 72-1 further includes a secondary winding 24-1 and the second power supply submodule 72-2 further includes a secondary winding 24-2. When the secondary windings are used for half-bridge full-wave rectification, corresponding switching devices on the secondary windings are shown in the FIG. 22. The secondary winding 24-1 is wound around the first magnetic column 11-1 and the second magnetic column 12-1. The secondary winding 24-2 is wound around the first magnetic column 11-2 and the second magnetic column 12-2. The secondary winding 24-1 are provided with secondary terminals Vo1 and GND1 and the secondary winding 24-2 are provided with secondary terminals Vo2 and GND2. The primary terminals 48b1 and 48d1 of the first power supply submodule 72-1 are electrically connected through the system board 46E. The primary terminal 48c1 of the first power supply submodule 72-1 is electrically connected to the primary terminal 48b2 of the second power supply submodule 72-2. The primary terminals 48a2 and 48d2 of the second power supply submodule 72-2 are electrically connected. The primary terminal 48a1 of the first power supply submodule 72-1 and the primary terminal 48d2 of the second power supply submodule 72-2 are connected to a primary bridge circuit via terminals V1 and V2 in the system board 46E. The terminals V1 and V2 represent electrical connection points between two lines of a primary AC circuit and the primary bridge circuit. The primary windings of the first power supply submodule 72-1 and the primary windings of the second power supply submodule 72-2 form a series connection through conductive lines in the system board 46E. In this embodiment, the primary windings 23-A1 and 23-B2 of the first power supply submodule 72-1 are connected in series through the connection of the system board 46E. Similarly, the primary windings 23-A2 and 23-B2 of the second power supply submodule 72-2 are connected in series through the connection of the system board 46E. The primary sides of the two power supply submodules form a series connection to realize primary sides with four turns through the connection of the system board 46E. Secondary sides of the two power supply submodules can be connected in parallel for outputting. For example, the secondary windings of each power supply submodule can form a complete winding in the power supply submodule and form secondary terminals Vo1, Vo2, GND1, and GND2. In other embodiments, the secondary windings may also form a complete winding through conductive lines in the system board 46E. For example, the secondary terminal Vo1 of the first power supply submodule 72-1 and the secondary terminal Vo2 of the second power supply submodule 72-2 in the figure are connected through the system board 46E. The secondary terminal GND1 of the first power supply submodule 72-1 and the secondary terminal GND2 of the second power supply submodule 72-2 are connected through the system board 46E, and then the intelligent IC load 7 (not shown) is powered through these terminals. In such a way, the series connection is possible on the system board 46E through the primary sides of the plurality of power supply submodules, thereby realizing different turn ratios and adjusting flexibly according to different transformer requirements. For example, if 48V is converted to 12V, the primary sides of the two power supply submodules may be connected in series, as shown in the figure. Each power supply submodule includes two primary windings and forms a turn ratio of 4:1 after series connection. When 48V is converted to 6V, three power supply submodules can connect the primary sides in series to form a turn ratio of 8:1 through the system board 46E. That is, by combination of the single standard module, multiple different transformer turn ratios can be realized, various requirements can be flexibly applied, and the number of turns of the windings of each power supply submodule can be reduced, thereby simplifying the structure.

Figure 23:
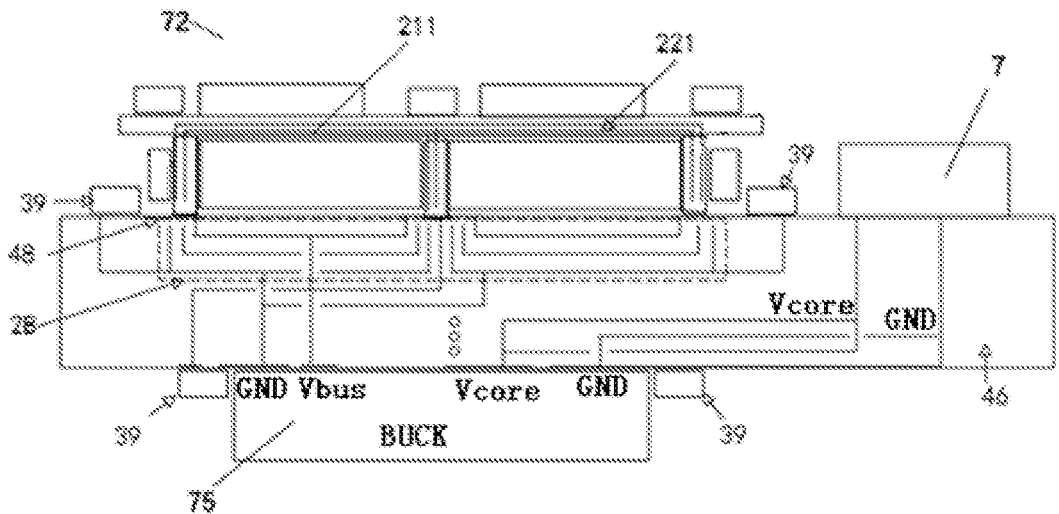
FIG. 23 is a schematic diagram of a power supply system according to the twelfth embodiment of the disclosure.

FIG. 23 is a schematic diagram of a power supply system according to the twelfth embodiment of the disclosure. The power supply system shown in FIG. 23 further includes a buck power supply module 75 electrically connected to the power supply module, thereby forming a voltage conversion device. The buck power supply module 75 is configured to receive a voltage provided by the power supply module and convert the voltage to power the intelligent IC load 7. The buck power supply module 75 and the power supply submodule 72 are on two opposite sides of the system board 46. Projections of the buck power supply module and the power supply submodule 72 on the system board 46 are at least partially overlapped. In such a way, an output current of the power supply submodule 72 is directly transmitted to the buck power supply module 75 through conductive vias of the system board 46, and then the buck power supply module 75 transmits the converted voltage to the intelligent IC load 7 via the system board 46. When an output voltage of the buck power supply module 75 is low, a transmission impedance from the power supply submodule 72 to the buck power supply module 75 can be reduced largely, thereby improving the efficiency of the system. Moreover, the structure is compact, and the occupied space on the system board 46 is small.

Figure 24:
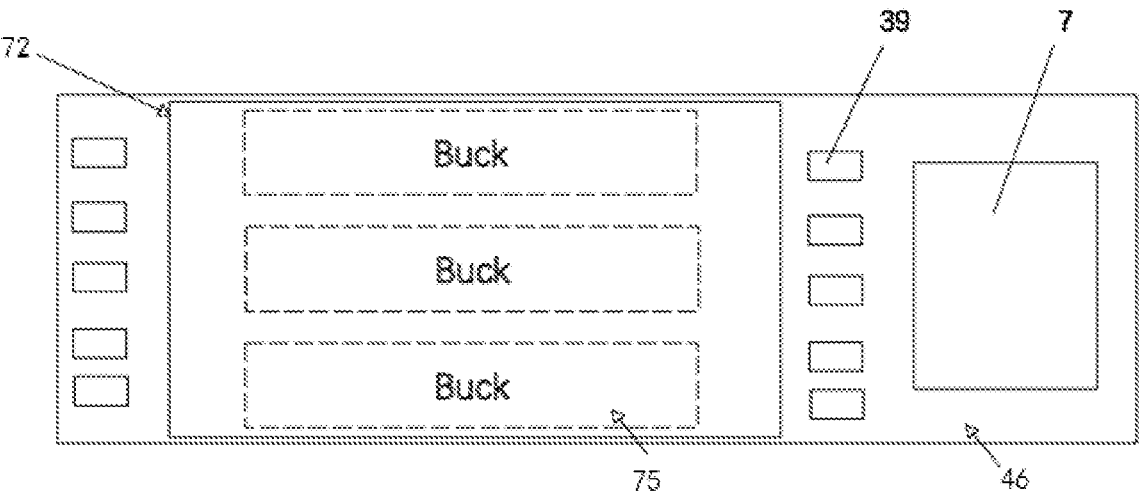
FIG. 24 is a top view of a voltage conversion device of FIG. 23.

FIG. 24 is a top view of a voltage conversion device of FIG. 23. In FIG. 24, one power supply submodule 72 may drive three buck power supply modules 75 and the specific number is determined according to power matching situations.

Figure 25:
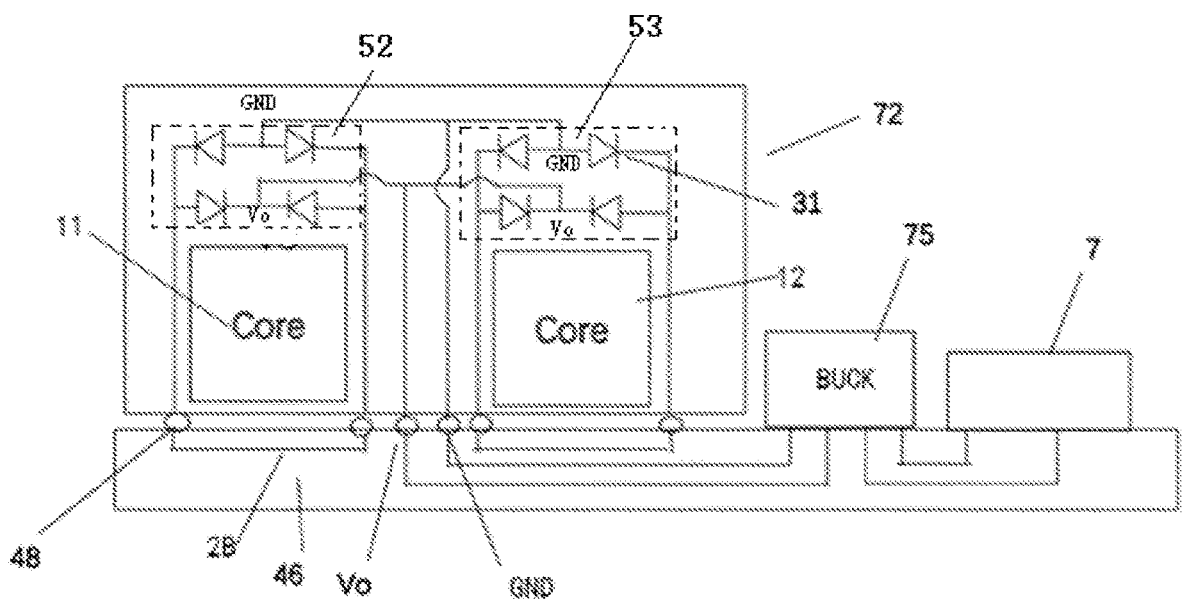
FIG. 25 is a schematic diagram of the power supply system according to the twelfth embodiment of the disclosure.

FIG. 25 is a schematic diagram of a power supply system according to the thirteenth embodiment of the disclosure. The power supply module of FIG. 25 further includes a first rectifier bridge 52 having an input electrically connected to the first winding and a second rectifier bridge 53 having an input electrically connected to the second winding. An output of the first rectifier bridge 52 and an output of the second rectifier bridge 53 are connected to a part of the plurality of pins 48 after parallel connection, and the part of pins is connected to the load 7 through the system board 46. If rectifier devices 31 are disposed above the first magnetic column 11, two output pins Vo and GND of the first rectifier bridge 52 and the second rectifier bridge 53 are connected to the pins 48 on a lower surface of the power supply submodule 72 and electrically connected to the system board 46 through soldering. After being processed by the buck power supply module 75, a current transmitted by the power supply submodule 72 is transmitted to the intelligent IC load 7 through the system board 46.

Figure 26:
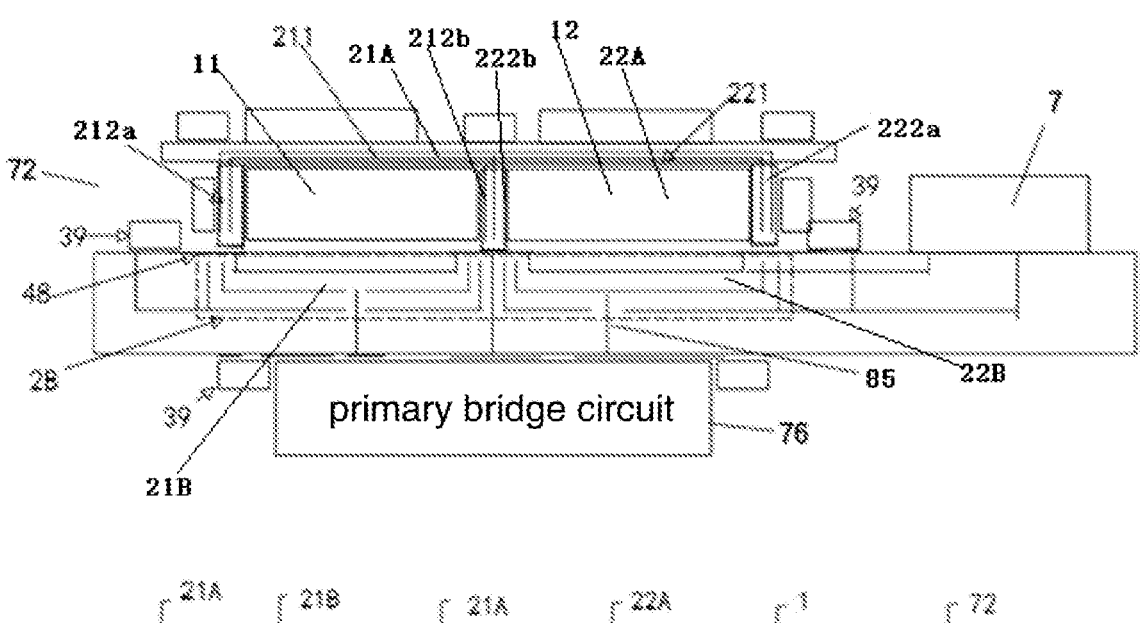
FIG. 26 is a schematic diagram of a power supply system according to the thirteenth embodiment of the disclosure.

FIG. 26 is a schematic diagram of a power supply system according to the fourteenth embodiment of the disclosure. The power supply system of FIG. 26 further includes a primary bridge circuit 76. The power supply submodule 72 and the intelligent IC load 7 are on the same side of the system board 46. The primary bridge circuit 76 and the power supply submodule 72 are on two opposite sides of the system board 46 and projections of the primary bridge circuit 76 and the power supply submodule 72 on the system board 46 are at least partially overlapped. In such a way, a more compact power supply submodule 72 can be realized. Moreover, an AC connection line between the primary bridge circuit 76 and the power supply submodule 72 is short. For example, the primary bridge circuit 76 and the power supply submodule 72 may be directly connected through a via connection bus 85 in the system board 46. A connection impedance can be reduced and interference of the AC connection line to other signal lines of the intelligent IC load 7 or the system board 46 is reduced. The primary bridge circuit 76, with reference to FIGS. 28a to 28d, may include a primary half-bridge or full-bridge circuit of the transformer of the circuit such as LLC. For example, the primary bridge circuit 76 is formed by discrete GaN modules on the system board 46 or may further include components such as driving chips of the switches and resonant capacitors in the primary bridge circuit. The primary bridge circuit 76 may also form a primary bridge circuit module, thereby reducing a volume or facilitating application.

Figure 27:
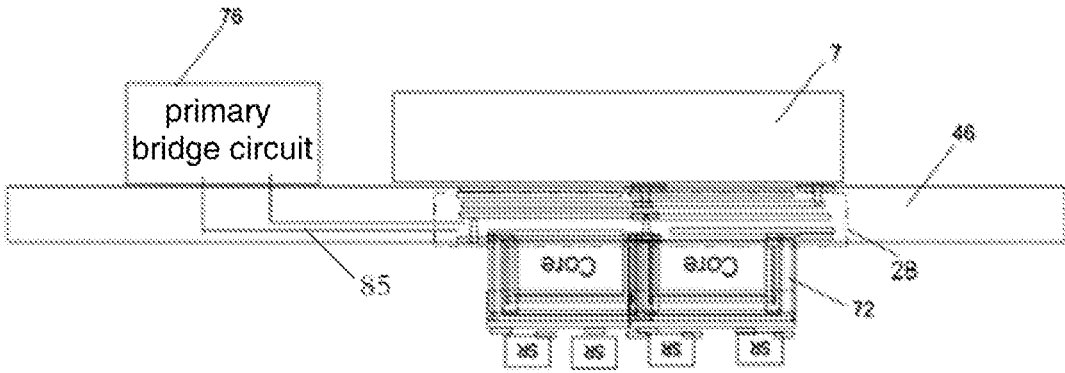
FIG. 27 is a schematic diagram of a power supply system according to the fourteenth embodiment of the disclosure.

FIG. 27 is a schematic diagram of a power supply system according to the fourteenth embodiment of the disclosure. The power supply system of FIG. 27 differs from the power supply system of FIG. 26 in that the power supply submodule 72 and the intelligent IC load 7 are on two opposite sides of the system board 46 and projections thereof on the system board 46 are at least partially overlapped, such that the power supply submodule 72 powers the intelligent IC load 7 vertically. The primary bridge circuit module 76 and the intelligent IC load 7 can be on the same side of the system board 46. The second winding unit 2B (a range surrounded by a double dot-dash line box illustrated in FIG. 27) can be directly electrically connected to an input end of the intelligent IC load 7, resulting in a small connection impedance and high transmission efficiency. A buck-boost circuit can be integrated into the primary bridge circuit module 76 and a voltage regulation and AC generation circuit module electrically connected to the power supply submodule 72 through the AC connection bus 85 is formed.

Figure 28A:
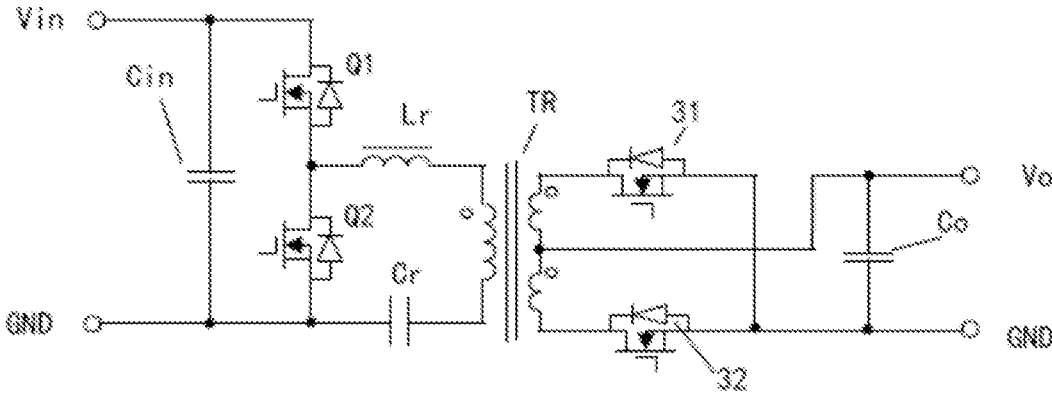
FIG. 28*a* illustrates a half-bridge LLC circuit.
Figure 28B:
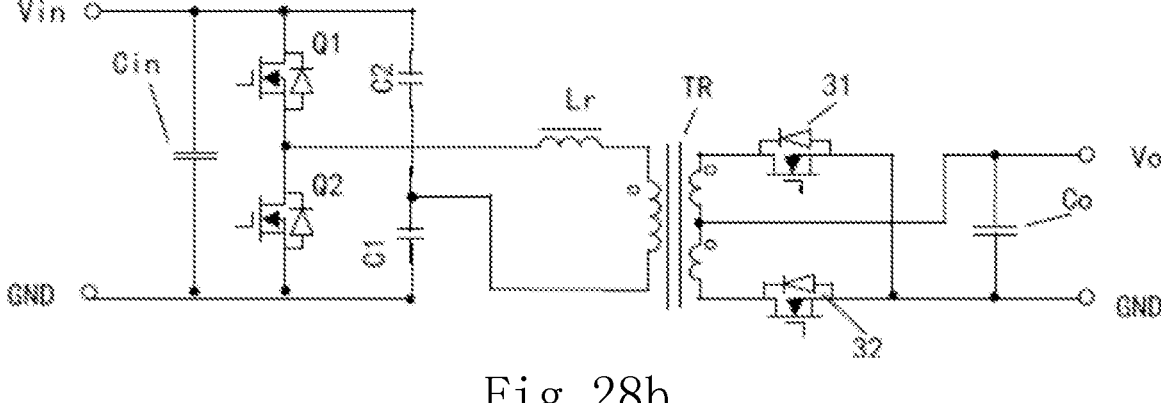
FIG. 28*b* illustrates another type of half-bridge LLC circuit.
Figure 28C:
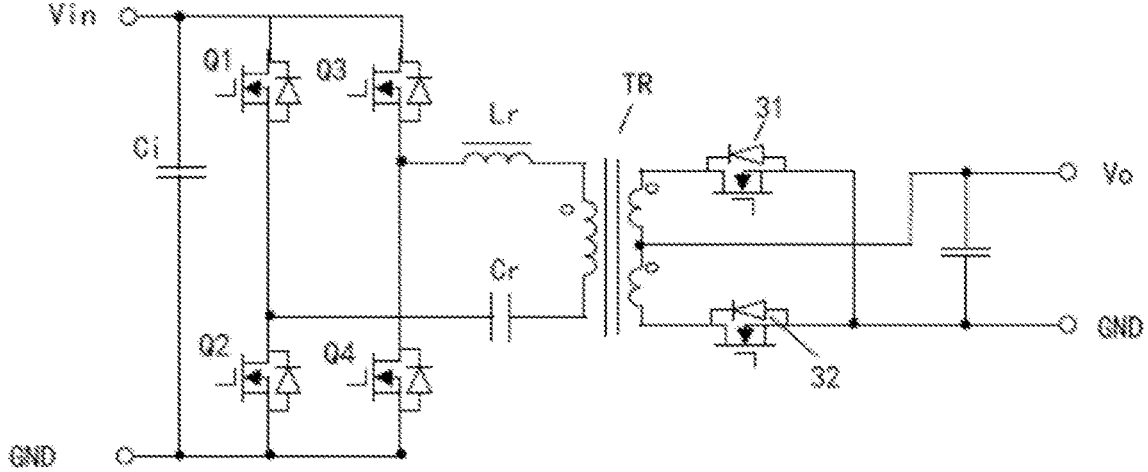
FIG. 28*c* illustrates a full bridge LLC circuit.
Figure 28D:
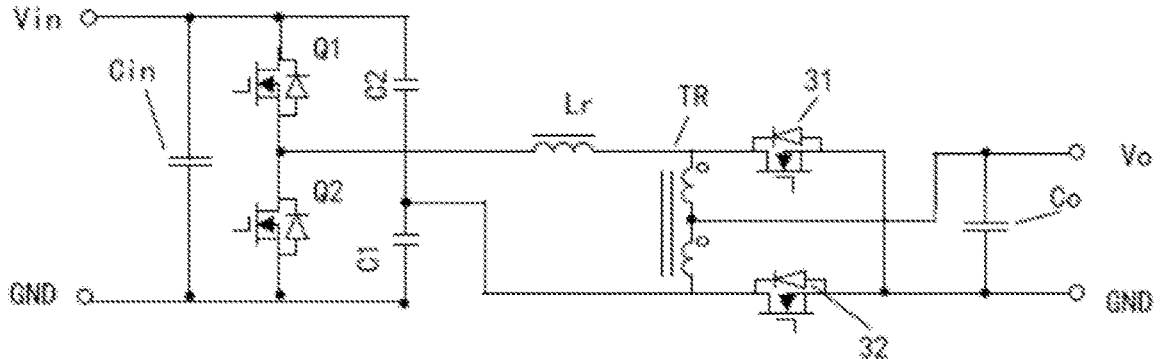
FIG. 28*d* illustrates an LLC circuit with an autotransformer.

FIGS. 28a to 28d illustrate some typical application circuits, but the disclosure is not limited thereto. FIG. 28a illustrates a half-bridge LLC circuit, FIG. 28b illustrates another type of half-bridge LLC circuit, FIG. 28c illustrates a full bridge LLC circuit, and FIG. 28d illustrates an LLC circuit with an autotransformer. In the FIGS. 31 to 32 represent rectifying elements, Q1 to Q4 represent switching devices of the primary bridge circuit, TR represents a transformer (a magnetic element), Co represents an output capacitor, Cin represents an input capacitor, Lr represents a resonant inductor, and Cr represents a resonant capacitor. In addition, the structure of the disclosure may also be applied to a Cuk circuit or a flyback circuit.

FIG. 28a illustrates that the primary bridge circuit 76 may include a half-bridge circuit formed by Q1 and Q2 and may further include an input capacitor, alternatively, a portion at the left of the transformer TR may be the primary bridge circuit 76.

In conclusion, according to the power supply module of the disclosure, since a part of the windings is integrated into the system board, the height of the power supply module may be reduced and a power density is improved. A part of the windings directly formed on the system board simplifies the structure of the windings of the power supply submodule 72 and simplifies output pins or the connection manner to the system board. For example, it is unnecessary to use the copper block to lead out the output pin, thereby reducing the number of components and simplifying the structure greatly. The output pin can be directly led out on the windings of the system board to be electrically connected to a power supply input end of the intelligent IC load, such that an output impedance can be reduced and transmission loss is reduced, thereby improving the efficiency of the system. According to the power supply module of the disclosure, the design of the system can be simplified to further reduce the size and cost of the system or device.

The features of some embodiments are described, such that those ordinary in the art can clearly understand forms of the specification. Those ordinary in the art can understand designing or changing other processes and structures to complete the same object of the above embodiments and/or achieve the same advantage of the above embodiments on the basis of the disclosure of the disclosure. Those ordinary in the art can also understand that equivalent constructions not departing from the spirit and scope of the disclosure may have any changes, replacements, and modifications without departing from the spirit and scope of the disclosure.

What is claimed is:

1. A power supply module for powering an intelligent IC on a system board, comprising:
    a power supply submodule comprising:
        a switch;
        a magnetic core assembly comprising:
            a first magnetic column, and
            a second magnetic column;
        a first winding unit comprising:
            a first winding portion wound around the first magnetic column, and a second winding portion wound around the second magnetic column;

a plurality of pins disposed on a lower surface of the power supply submodule; and a second winding unit comprising:

a third winding portion disposed on or in the system board and wound around the first magnetic column and connected to the first winding portion via at least a part of the plurality of pins to form a first winding, and a fourth winding portion disposed on or in the system board and wound around the second magnetic column and connected to the second winding portion via at least a part of the plurality of pins to form a second winding;

wherein the magnetic core assembly, at least the first winding, and the second winding form a magnetic element, and wherein the switch is disposed on and electrically connected to the magnetic element.

2. The power supply module according to claim 1, wherein at least one of the plurality of pins is an output pin of the power supply module, and wherein the power supply module powers the intelligent IC through the output pin.

3. The power supply module according to claim 1, wherein the first winding portion comprises:

a first horizontal winding disposed above the first magnetic column, and a first vertical winding and a second vertical winding disposed at both sides of the first magnetic column and connected to the first horizontal winding; and wherein the second winding portion comprises:

a second horizontal winding disposed above the second magnetic column, and a third vertical winding and a fourth vertical winding disposed at both sides of the second magnetic column and connected to the second horizontal winding.

4. The power supply module according to claim 3, further comprising a first circuit board on an outer side of the first magnetic column, a second circuit board on an outer side of the second magnetic column, a third circuit board between the first magnetic column and the second magnetic column, and a horizontal winding circuit board on upper surfaces of the first magnetic column and the second magnetic column, wherein the first vertical winding and the second vertical winding are disposed on or in the first and third circuit boards respectively, wherein the third vertical winding and the fourth vertical winding are disposed on or in the second and third circuit boards respectively, and wherein the first horizontal winding and the second horizontal winding are disposed on or in the horizontal winding circuit board.

5. The power supply module according to claim 4, wherein the second vertical winding and the fourth vertical winding on the third circuit board share one metal conductor.

6. The power supply module according to claim 4, wherein the first circuit board, the third circuit board, and the horizontal winding circuit board form a first accommodation space for accommodating the first magnetic column, wherein the second circuit board, the third circuit board, and the horizontal winding circuit board form a second accommodation space for accommodating the second magnetic column, wherein the first circuit board and the third circuit board are lateral sides of the first accommodation space, wherein the second circuit board and the third circuit board are lateral sides of the second accommodation space, and wherein the horizontal winding circuit board is a bottom side of the first accommodation space and the second accommodation space.

7. The power supply module according to claim 4, wherein the first circuit board, the first magnetic column, the third circuit board, the second magnetic column, and the second circuit board form a pre-package.

8. The power supply module according to claim 7, further comprising a bonding layer and a plurality of conductive vias, wherein the bonding layer is bonded on the pre-package, and wherein the horizontal winding circuit board is disposed on the bonding layer and electrically connected to the first vertical winding, the second vertical winding, the third vertical winding, and the fourth vertical winding through the plurality of conductive vias.

9. The power supply module according to claim 4, further comprising an electronic component, wherein the electronic component is disposed on a surface of the first circuit board away from the first magnetic column, or a surface of the second circuit board away from the second magnetic column, or an upper surface of the horizontal winding circuit board, or wherein the electronic component is disposed at an extension portion of a lower surface of the horizontal winding circuit board extending to an outer side of the first magnetic column and/or the second magnetic column along a horizontal direction.

10. The power supply module according to claim 3, further comprising a grooved circuit board having a lower surface provided with a first groove for accommodating the first magnetic column and a second groove for accommodating the second magnetic column, wherein a bottom side of the first groove is provided with the first horizontal winding and two lateral sides of the first groove are provided with the first vertical winding and the second vertical winding respectively, such that the first horizontal winding, the first vertical winding, and the second vertical winding wrap three sides of the first magnetic column, and wherein a bottom side of the second groove is provided with the second horizontal winding and two lateral sides of the second groove are provided with the third vertical winding and the fourth vertical winding respectively, such that the second horizontal winding, the third vertical winding, and the fourth vertical winding wrap three sides of the second magnetic column.

11. The power supply module according to claim 10, wherein the lower surface of the grooved circuit board is provided with a plurality of pins electrically connected to the first vertical winding, the second vertical winding, the third vertical winding, and the fourth vertical winding correspondingly, and electrically connected to the system board.

12. The power supply module according to claim 1, further comprising a first rectifier bridge having an input electrically connected to the first winding and a second rectifier bridge having an input electrically connected to the second winding, wherein an output of the first rectifier bridge and an output of the second rectifier bridge are connected in parallel and then to a part of the plurality of pins that is connected to the intelligent IC through the system board.

13. The power supply module according to claim 1, wherein the first winding portion comprises:

a first horizontal winding disposed above the first magnetic column, and a second vertical winding disposed between the first magnetic column and the second magnetic column;

wherein the second winding portion comprises:

a second horizontal winding disposed above the second magnetic column, and a fourth vertical winding disposed between the first magnetic column and the second magnetic column;

wherein the third winding portion comprises:

a third horizontal winding disposed below the first magnetic column, and a first vertical winding disposed at the left of the first magnetic column;

the fourth winding portion comprises:

a fourth horizontal winding disposed below the second magnetic column, and a third vertical winding disposed at the right of the second magnetic column; and wherein the system board is provided with a third groove for accommodating the first magnetic column and the second magnetic column.

14. The power supply module according to claim 13, wherein the first horizontal winding and the second horizontal winding are disposed on a horizontal winding circuit board, and wherein the second vertical winding and the fourth vertical winding are disposed on or in a third circuit board.

15. The power supply module according to claim 1, wherein the first winding portion comprises:

a first horizontal winding disposed above the first magnetic column;

the second winding portion comprises:

a second horizontal winding disposed above the second magnetic column;

wherein the third winding portion comprises:

a third horizontal winding disposed below the first magnetic column, and a first vertical winding and a second vertical winding disposed at both sides of the first magnetic column respectively, and connected to the third horizontal winding;

wherein the fourth winding portion comprises:

a fourth horizontal winding disposed below the second magnetic column, and a third vertical winding and a fourth vertical winding disposed at both sides of the second magnetic column respectively, and connected to the fourth horizontal winding; and wherein the system board is provided with a fourth groove and a fifth groove for accommodating the first magnetic column and the second magnetic column respectively.

16. The power supply module according to claim 15, wherein the first horizontal winding and the second horizontal winding are disposed on or in a horizontal winding circuit board.

17. The power supply module according to claim 16, wherein a first magnetic cover and a second magnetic cover are disposed above and across the first magnetic column and the second magnetic column, and wherein the first magnetic cover and the second magnetic cover are parallel to each other.

18. A voltage conversion device, comprising:

a power supply module according to claim 1;

a buck power supply module electrically connected to the power supply module and configured to convert a voltage provided by the power supply module to power the intelligent IC.

19. The voltage conversion device according to claim 18, wherein the buck power supply module and the power supply submodule are at two opposite sides of the system board respectively, and wherein projections of the buck power supply module and the power supply submodule on the system board are at least partially overlapped.

20. The voltage conversion device according to claim 18, further comprising a primary bridge circuit module, wherein the primary bridge circuit module and the power supply submodule are at two opposite sides of the system board respectively, and wherein projections of the primary bridge circuit module and the power supply submodule on the system board are at least partially overlapped.

21. The voltage conversion device according to claim 20, wherein the power supply submodule and the intelligent IC are at two opposite sides of the system board respectively, and wherein projections of the power supply submodule and the intelligent IC on the system board are at least partially overlapped.

22. A power supply module for powering an intelligent IC on a system board, comprising:

a third power supply submodule disposed on an upper surface of the system board and comprising:

a first switch, a first magnetic column, and a first winding portion wound around the first magnetic column;

a fourth power supply submodule disposed on a lower surface of the system board and being opposite to the third power supply submodule, comprising:

a second switch, a second magnetic column, and a second winding portion wound around the second magnetic column;

a plurality of first pins on a lower surface of the third power supply submodule;

a plurality of second pins on an upper surface of the fourth power supply submodule; and a second winding unit comprising:

a third winding portion disposed on or in the system board and below the first magnetic column and connected to the first winding portion via at least a part of the plurality of first pins to form a first winding, and a fourth winding portion disposed on or in the system board and above the second magnetic column and connected to the second winding portion via at least a part of the plurality of second pins to form a second winding;

wherein the first magnetic column, the second magnetic column, at least the first winding, and the second winding form a magnetic element, and wherein the first switch and the second switch are disposed on and electrically connected to the magnetic element.

23. The power supply module according to claim 22, wherein, at least one of the plurality of first pins and the plurality of second pins is an output pin of the power supply module, through which the power supply module powers the intelligent IC.

24. The power supply module according to claim 23, wherein the first winding portion comprises:

a first horizontal winding disposed above the first magnetic column, and a first vertical winding and a second vertical winding disposed at both sides of the first magnetic column respectively and connected to the first horizontal winding; and wherein the second winding portion comprises:

a second horizontal winding disposed below the second magnetic column, and a third vertical winding and a fourth vertical winding disposed at both sides of the second magnetic column respectively and connected to the second horizontal winding.

\* \* \* \* \*